US011535764B2

(12) United States Patent
Watanabe et al.

(10) Patent No.: US 11,535,764 B2
(45) Date of Patent: Dec. 27, 2022

(54) AQUEOUS GRAVURE INK

(71) Applicant: KAO CORPORATION, Tokyo (JP)

(72) Inventors: Kazuki Watanabe, Sapporo (JP);
Ryuma Mizushima, Wakayama (JP);
Takahiro Sato, Wakayama (JP);
Yasufumi Ueda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 245 days.

(21) Appl. No.: 16/349,195

(22) PCT Filed: Nov. 13, 2017

(86) PCT No.: PCT/JP2017/040808
§ 371 (c)(1),
(2) Date: May 10, 2019

(87) PCT Pub. No.: WO2018/088560
PCT Pub. Date: May 17, 2018

(65) Prior Publication Data
US 2019/0264043 A1  Aug. 29, 2019

(30) Foreign Application Priority Data
Nov. 14, 2016  (JP) .............................. JP2016-221864

(51) Int. Cl.
C09D 11/033 (2014.01)
C09D 11/107 (2014.01)
C09D 11/03 (2014.01)
C09D 11/037 (2014.01)
C09D 11/023 (2014.01)

(52) U.S. Cl.
CPC .......... C09D 11/033 (2013.01); C09D 11/023 (2013.01); C09D 11/03 (2013.01); C09D 11/037 (2013.01); C09D 11/107 (2013.01)

(58) Field of Classification Search
CPC ..... C09D 11/033; C09D 11/03; C09D 11/037; C09D 11/107; C09D 11/023
USPC ................................................. 523/160, 161
See application file for complete search history.

(56) References Cited

U.S. PATENT DOCUMENTS

| | | | | |
|---|---|---|---|---|
| 6,132,502 A | * | 10/2000 | Yatake | C09D 11/322 106/31.89 |
| 2002/0192381 A1 | | 12/2002 | Nitzan et al. | |
| 2003/0072923 A1 | * | 4/2003 | Sumioka | B41M 5/5227 428/195.1 |
| 2003/0177940 A1 | * | 9/2003 | Fujioka | C09D 11/30 106/31.6 |
| 2004/0127601 A1 | * | 7/2004 | Sano | C09D 11/326 523/160 |
| 2005/0203209 A1 | | 9/2005 | Furutani et al. | |
| 2008/0234428 A1 | | 9/2008 | Furutani et al. | |
| 2009/0231407 A1 | * | 9/2009 | Kachi | B41J 2/14233 347/104 |
| 2010/0178425 A1 | * | 7/2010 | Ooishi | C09D 11/322 427/256 |
| 2013/0002776 A1 | | 1/2013 | Nagashima et al. | |
| 2013/0334454 A1 | | 12/2013 | Koehler et al. | |
| 2016/0194508 A1 | | 7/2016 | Yodo et al. | |
| 2016/0230334 A1 | | 8/2016 | Oki et al. | |
| 2016/0251524 A1 | * | 9/2016 | Kohyama | C08F 293/005 524/533 |
| 2017/0369725 A1 | | 12/2017 | Mitsuyoshi et al. | |

FOREIGN PATENT DOCUMENTS

| | | |
|---|---|---|
| CN | 1990619 A | 7/2007 |
| CN | 103429681 A | 12/2013 |
| CN | 105452399 A | 3/2016 |
| EP | 1288285 A1 | 3/2003 |
| JP | 8-199495 A | 8/1996 |
| JP | 2002-188029 A | 7/2002 |
| JP | 2005-41994 A | 2/2005 |
| JP | 2009-1662 A | 1/2009 |
| JP | 2011-46874 A | 3/2011 |
| JP | 2012-201742 A | 10/2012 |
| JP | 2013-142150 A | 7/2013 |
| JP | 2014-205816 A | 10/2014 |
| JP | 2015-30799 A | 2/2015 |
| JP | 2015-102756 A | 6/2015 |
| JP | 5888589 B2 | 3/2016 |
| JP | 2016-44282 A | 4/2016 |
| JP | 2016-141802 A | 8/2016 |
| WO | WO 99/27023 A1 | 6/1999 |
| WO | WO 2015/056591 A1 | 4/2015 |

(Continued)

OTHER PUBLICATIONS

U.S. Appl. No. 16/957,262, filed Jun. 23, 2020.
U.S. Appl. No. 15/756,341, filed Feb. 28, 2018.
U.S. Appl. No. 15/756,364, filed Feb. 28, 2018.
International Search Report (PCT/ISA/210) issued in PCT/JP2017/040808, dated Jan. 9, 2018.
U.S. Appl. No. 16/972,419, filed Dec. 4, 2020.
U.S. Appl. No. 17/268,029, filed Feb. 11, 2021.
Extended European Search Report, dated Jun. 16, 2023, for European Application No. 17870501.8.

Primary Examiner — Doris L Lee
(74) Attorney, Agent, or Firm — Birch, Stewart, Kolasch & Birch, LLP

(57) ABSTRACT

The present invention relates to an aqueous gravure ink containing a pigment, a polymer, a water-soluble organic solvent, a surfactant and water, in which the water-soluble organic solvent contains a glycol ether having a boiling point of from 100 to 260° C., and a content of the glycol ether in the ink is from 1 to 10% by mass; a total content of the water-soluble organic solvent in the ink is not more than 15% by mass; the surfactant contains an acetylene glycol-based surfactant; and a content of water in the ink is from 50 to 70% by mass.

15 Claims, No Drawings

(56) References Cited

FOREIGN PATENT DOCUMENTS

WO    WO 2015/087710    *   6/2015
WO    WO 2016/104294 A1    6/2016

* cited by examiner

AQUEOUS GRAVURE INK

FIELD OF THE INVENTION

The present invention relates to an aqueous gravure ink.

BACKGROUND OF THE INVENTION

Gravure printing is a printing method in which an ink is transferred to a printing substrate using a gravure printing plate on which recessed cells for receiving the ink are formed. The depth of each of the cells as well as the distance between the respective cells (number of lines) can be adequately determined to well control a quality of the gravure printing.

In addition, the gravure printing is capable of performing higher-resolution printing as compared to the other conventional printing methods, and therefore has been practically utilized in security printing for preventing production of imitations, etc. For this reason, in the gravure printing, it has been required to use special inks such as pearlescent inks or fluorescent inks.

If high-resolution micro-characters can be printed with pigment inks having an ordinary composition without using the special inks, it is possible to satisfy high requirements in the market for inexpensive security printing techniques, and provide new methods of utilizing the printing techniques for control of in-house information, secret marking on goods or articles, etc. Under these circumstances, various aqueous gravure inks capable of meeting these requirements have been conventionally proposed.

In addition, as gravure inks used in the gravure printing, non-toluene inks have been employed for the purpose of improving the working environment. However, the non-toluene inks have still failed to achieve reduction of an amount of volatile organic compounds used and reduction of emission of $CO_2$. Therefore, there is an increasing demand for aqueous gravure inks having a less burden on the environment.

For example, JP 2002-188029A (Patent Literature 1) discloses a water-soluble printing ink composition using N-methyl pyrrolidone, a glycol ether, an esterified product of a glycol ether and a terpene, which is capable of performing good printing on a highly-nonpolar resin film.

JP 2013-142150A (Patent Literature 2) discloses an aqueous gravure printing ink composition for cartons which contains a colorant, an alkali-dissolvable water-soluble resin, an emulsion-type aqueous resin, a printing modifier and an aqueous medium, and is capable of satisfying both of good drying properties and good printability.

JP 2016-44282A (Patent Literature 3) discloses an aqueous printing ink composition for gravure printing which contains a propylene glycol ether as a solvent, a polyurethane-based resin and an acetylene glycol-based compound, and is capable of attaining good printability such as leveling properties.

SUMMARY OF THE INVENTION

The present invention relates to an aqueous gravure ink containing a pigment, a polymer, a water-soluble organic solvent, a surfactant and water,
in which the water-soluble organic solvent contains a glycol ether having a boiling point of not lower than 100° C. and not higher than 260° C., and a content of the glycol ether in the ink is not less than 1% by mass and not more than 10% by mass;
a total content of the water-soluble organic solvent in the ink is not more than 15% by mass;
the surfactant contains an acetylene glycol-based surfactant; and
a content of water in the ink is not less than 50% by mass and not more than 70% by mass.

DETAILED DESCRIPTION OF THE INVENTION

In the aqueous ink compositions described in the Patent Literatures 1 to 3, ethanol or isopropanol having a low boiling point is used as a diluent for a base ink upon printing. Therefore, these ink compositions have failed to provide an ink having a less burden on the environment. The inks containing water as a main component of the solvent but containing no low-boiling solvent tend to be deteriorated in wettability to a printing substrate owing to a high surface tension thereof and also exhibit poor drying properties. In addition, after transferring the aqueous gravure inks from the cells on the gravure printing plate to the printing substrate, the aqueous gravure inks tend to fail to fully spread over the printing substrate and tend to be interspersed over the printing substrate, so that the resulting printed characters or images tend to suffer from color unevenness or mottling owing to missing dots or rough feel on the printed surface, thereby failing to obtain a high-resolution printed material. Under these circumstances, there is an increasing demand for an aqueous gravure ink that is capable of fully satisfying spreadability of the ink (hereinafter also referred to merely as "leveling properties"), and has a less burden on the environment.

The present invention relates to an aqueous gravure ink that has a less burden on the environment and is capable of performing high-resolution printing owing to excellent leveling properties thereof.

The present inventors have found that by using an aqueous gravure ink that contains a pigment, a polymer, a water-soluble organic solvent, a surfactant and water in which a specific glycol ether and water are respectively used in specific amounts, and the surfactant contains an acetylene glycol-based surfactant, it is possible to reduce the burden on the environment, and achieve high-resolution printing owing to excellent leveling properties of the ink. In the aqueous gravure ink of the present invention, since a total content of the water-soluble organic solvent in the ink is defined to a specific range, it is not necessary to further dilute the ink with a solvent upon printing, and it is therefore possible to reduce the burden on the environment.

That is, the present invention relates to an aqueous gravure ink containing a pigment, a polymer, a water-soluble organic solvent, a surfactant and water,
in which the water-soluble organic solvent contains a glycol ether having a boiling point of not lower than 100° C. and not higher than 260° C., and a content of the glycol ether in the ink is not less than 1% by mass and not more than 10% by mass;
a total content of the water-soluble organic solvent in the ink is not more than 15% by mass;
the surfactant contains an acetylene glycol-based surfactant; and
a content of water in the ink is not less than 50% by mass and not more than 70% by mass.

In accordance with the present invention, it is possible to provide an aqueous gravure ink that has a less burden on the environment and is capable of performing high-resolution printing owing to excellent leveling properties thereof.

[Aqueous Gravure Ink]

The aqueous gravure ink of the present invention (hereinafter also referred to merely as a "gravure ink" or an "ink") contains a pigment, a polymer, a water-soluble organic solvent, a surfactant and water, in which the water-soluble organic solvent contains a glycol ether having a boiling point of not lower than 100° C. and not higher than 260° C., and a content of the glycol ether in the ink is not less than 1% by mass and not more than 10% by mass; a total content of the water-soluble organic solvent in the ink is not more than 15% by mass; the surfactant contains an acetylene glycol-based surfactant; and a content of water in the ink is not less than 50% by mass and not more than 70% by mass.

The contents of the respective components in the gravure ink as mentioned below represent contents of the components in the gravure ink used when performing the gravure printing. The contents of the respective components in the gravure ink may be directly controlled to those contents used upon the printing. Alternatively, a previously prepared base ink may be diluted with water, etc., to prepare the gravure ink containing the respective components whose contents are controlled to those contents used upon the printing.

The ink of the present invention is capable of exhibiting a less burden on the environment and performing high-resolution printing owing to excellent leveling properties thereof. The reason why the aforementioned advantageous effects can be attained by the present invention is considered as follows, though it is not clearly determined yet.

The ink of the present invention contains the glycol ether having a boiling point of not lower than 100° C. and not higher than 260° C. in an amount of not less than 1% by mass and not more than 10% by mass, and also contains water in an amount of not less than 50% by mass and not more than 70% by mass. For this reason, the ink can be prevented from being dried in cells of a gravure printing plate, and therefore can maintain a high transfer rate to a printing substrate. In addition, it is considered that since the ink of the present invention contains the acetylene glycol-based surfactant as the surfactant to be incorporated therein, it is possible to maintain good wettability to the printing substrate for the ink and thereby improve leveling properties of the ink. Furthermore, since the total content of the water-soluble organic solvent in the ink is controlled to 15% by mass or less, the ink has a less burden on the environment.

When the content of the glycol ether having a boiling point of not lower than 100° C. and not higher than 260° C. in the ink exceeds 10% by mass, the resulting ink tends to be deteriorated in leveling properties.

<Pigment>

The pigment used in the ink of the present invention may be any kind of pigment, i.e., may be either an inorganic pigment and an organic pigment.

Examples of the inorganic pigment include carbon blacks, metal oxides and the like. The carbon blacks are preferably used as a pigment for black inks. The carbon blacks may include furnace blacks, thermal lamp blacks, acetylene blacks and channel blacks. As a pigment for white inks, there may be used metal oxides such as titanium dioxide, zinc oxide, silica, alumina and magnesium oxide, etc. These inorganic pigments may be subjected to surface treatments with conventionally known hydrophobilizing agents such as a titanium coupling agent, a silane coupling agent and a higher fatty acid metal salt.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

The hue of the pigment used in the present invention is not particularly limited. In chromatic inks, there may be used any chromatic pigment having a yellow color, a magenta color, a cyan color, a red color, a blue color, an orange color, a green color, etc.

Among the aforementioned pigments, from the viewpoint of improving leveling properties of the resulting ink, preferred are inorganic pigments, more preferred are metal oxides, and even more preferred is titanium dioxide.

The pigment used in the present invention is preferably in the form of at least one pigment selected from the group consisting of a self-dispersible pigment, and pigment particles dispersed with a polymer, and more preferably in the form of the pigment particles dispersed with a polymer (hereinafter also referred to merely as "pigment particles A").

(Self-Dispersible Pigment)

The self-dispersible pigment that may be used in the present invention means a pigment onto a surface of which at least one hydrophilic functional group (including an anionic hydrophilic group such as a carboxy group and a sulfonic group or a cationic hydrophilic group such as a quaternary ammonium group) is bonded either directly or through the other atom group such as an alkanediyl group having not less than 1 and not more than 12 carbon atoms to thereby render the pigment dispersible in an aqueous medium without using a surfactant or a resin. In order to form a pigment into a self-dispersible pigment, for example, a necessary amount of the hydrophilic functional group may be chemically bonded to the surface of the pigment by an ordinary method.

Specific examples of commercially available products of the self-dispersible pigment include "CAB-O-JET 200", "CAB-O-JET 300", "CAB-O-JET 352K", "CAB-O-JET 250A", "CAB-O-JET 260M", "CAB-O-JET 270Y", "CAB-O-JET 450A", "CAB-O-JET 465M", "CAB-O-JET 470Y" and "CAB-O-JET 480V" available from Cabot Japan K.K.; "BONJET CW-1", "BONJET CW-2", etc., available from Orient Chemical Industries Co., Ltd.; "Aqua-Black 162", etc., available from Tokai Carbon Co., Ltd.; and "SENSIJET BLACK SDP100", "SENSIJET BLACK SDP1000", "SENSIJET BLACK SDP2000", etc., available from SENSIENT INDUSTRIAL COLORS. The self-dispersible pigment is preferably used in the form of a pigment water dispersion prepared by dispersing the pigment in water.

The content of the pigment in the ink is preferably not less than 1% by mass, more preferably not less than 2% by mass, even more preferably not less than 3% by mass, further even more preferably not less than 5% by mass, still further even more preferably not less than 10% by mass and furthermore preferably not less than 15% by mass, and is also preferably not more than 30% by mass, more preferably not more than 25% by mass and even more preferably not more than 20% by mass, from the viewpoint of improving optical density of the resulting ink upon printing.

<Polymer>

The polymer used in the present invention is preferably in the form of any of a water-soluble polymer and a water-insoluble polymer. Of these polymers, preferred is the water-insoluble polymer.

The water-soluble polymer as used herein means such a polymer that when the polymer is dried to a constant weight at 105° C. for 2 hours and then dissolved in 100 g of water at 25° C., the solubility in water of the polymer is not less than 10 g. In the case where the water-soluble polymer is in the form of an anionic polymer, the aforementioned solubility means a solubility of the polymer whose anionic groups are neutralized completely (i.e., 100%) with sodium hydroxide.

The water-insoluble polymer as used herein means such a polymer that when the polymer is dried to a constant weight at 105° C. for 2 hours and then dissolved in 100 g of water at 25° C., the solubility in water of the polymer is less than 10 g. The solubility in water of the water-insoluble polymer is preferably less than 5 g and more preferably less than 1 g. In the case where the water-insoluble polymer is in the form of an anionic polymer, the aforementioned solubility means a solubility of the polymer whose anionic groups are neutralized completely (i.e., 100%) with sodium hydroxide.

Examples of the polymer used in the present invention include polyesters, polyurethanes and vinyl-based polymers. As the polymer, from the viewpoint of improving dispersion stability of the pigment in the resulting ink, preferred are vinyl-based polymers obtained by addition-polymerizing a vinyl monomer such as a vinyl compound, a vinylidene compound and a vinylene compound.

Specific examples of commercially available products of the vinyl-based polymers include polyacrylic acids such as "ARON AC-10SL" available from Toagosei Co., Ltd., and styrene-acrylic resins such as "JONCRYL 67", "JONCRYL 611", "JONCRYL 678", "JONCRYL 680", "JONCRYL 690" and "JONCRYL 819" all available from BASF Japan, Ltd., etc.

The content of the polymer in the ink is preferably not less than 3% by mass, more preferably not less than 5% by mass, even more preferably not less than 7% by mass and further even more preferably not less than 10% by mass, and is also preferably not more than 38% by mass, more preferably not more than 30% by mass, even more preferably not more than 25% by mass, further even more preferably not more than 20% by mass and still further even more preferably not more than 15% by mass, from the viewpoint of improving dispersibility of the pigment and fixing properties of the resulting ink.

The polymer used in the present invention is preferably dispersed in the gravure ink in the form of the pigment particles A dispersed with the polymer (pigment particles A), or in the form of pigment-free polymer particles B (hereinafter also referred to merely as "polymer particles B"). In the following, the polymer constituting the pigment particles A is also referred to as a "polymer (a)", and the polymer constituting the polymer particles B is also referred to as a "polymer (b)".

[Polymer (a)]

The polymer (a) is a polymer having a capability of dispersing the pigment in an aqueous medium containing water as a main component at ordinary temperatures. Examples of the polymer (a) used in the present invention include polyesters, polyurethanes and vinyl-based polymers. Among these polymers, from the viewpoint of improving stability of the resulting ink, preferred are vinyl-based polymers obtained by addition-polymerizing a vinyl monomer such as a vinyl compound, a vinylidene compound and a vinylene compound.

The vinyl-based polymer used in the present invention preferably contains a constitutional unit derived from (a-1) an ionic monomer (hereinafter also referred to merely as a "component (a-1)"), and is more preferably in the form of a water-soluble vinyl-based polymer that is produced by copolymerizing a monomer mixture A containing the ionic monomer (a-1) and (a-2) a nonionic monomer (hereinafter also referred to merely as a "component (a-2)") (such a mixture is hereinafter also referred to merely as a "monomer mixture A"). The water-soluble vinyl-based polymer contains the constitutional unit derived from the component (a-1) and a constitutional unit derived from the component (a-2).

[(a-1) Ionic Monomer]

The component (a-1) is preferably used as a monomer component of the polymer (a) from the viewpoint of improving dispersion stability of the pigment particles dispersed with the polymer in the ink. Examples of the ionic monomer include anionic monomers and cationic monomers. Among these monomers, preferred are anionic monomers.

Examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Among these anionic monomers, from the viewpoint of improving dispersion stability of the pigment particles dispersed with the polymer in the ink, preferred are the carboxylic acid monomers, and more preferred is at least one monomer selected from the group consisting of acrylic acid and methacrylic acid.

[(a-2) Nonionic Monomer]

From the viewpoint of improving dispersion stability of the pigment particles dispersed with the polymer in the ink, the component (a-2) is in the form of a monomer having high affinity to water or a water-soluble organic solvent. Examples of the component (a-2) include monomers containing a hydroxy group or a polyalkylene glycol chain.

Specific examples of the component (a-2) include a hydroxyalkyl (meth)acrylate such as 2-hydroxyethyl (meth) acrylate and 3-hydroxypropyl (meth)acrylate; a polyalkylene glycol (meth)acrylate such as polyethylene glycol (meth)acrylate (n=2 to 30 wherein n represents an average molar number of addition of oxyalkylene groups: hereinafter defined in the same way) and polypropylene glycol (n=2 to 30) (meth)acrylate; an alkoxy polyalkylene glycol (meth) acrylate such as methoxy polyethylene glycol (n=1 to 30) (meth)acrylate; and phenoxy (ethylene glycol/propylene glycol copolymer) (n=1 to 30 in which n for ethylene glycol: n=1 to 29) (meth)acrylate. Among these nonionic monomers, preferred are a polyalkylene glycol (meth)acrylate and an alkoxy polyalkylene glycol (meth)acrylate, more preferred is an alkoxy polyalkylene glycol (meth)acrylate, and even more preferred is methoxy polyethylene glycol (n=1 to 30) (meth)acrylate. The term "(meth)acrylate" as used herein means at least one compound selected from the group consisting of an acrylate and a methacrylate, and the term "(meth)acrylate" as used hereinafter is also defined in the same way.

Specific examples of commercially available products of the component (a-2) include "NK ESTER M-20G", "NK ESTER M-40G", "NK ESTER M-90G", "NK ESTER M-230G" and the like as products available from Shin-Nakamura Chemical Co., Ltd.; and "BLEMMER PE-90", "BLEMMER PE-200", "BLEMMER PE-350" and the like, "BLEMMER PME-100", "BLEMMER PME-200", "BLEMMER PME-400" and the like, "BLEMMER PP-500", "BLEMMER PP-800", "BLEMMER PP-1000" and the like, "BLEMMER AP-150", "BLEMMER AP-400", "BLEMMER AP-550" and the like, and "BLEMMER 50PEP-300", "BLEMMER 50POEP-800B", "BLEMMER 43PAPE-600B" and the like as products available from NOF Corporation.

[(a-3) Hydrophobic Monomer]

In the polymer (a), (a-3) a hydrophobic monomer (hereinafter also referred to merely as a "component (a-3)") is further used as a monomer component thereof from the viewpoint of improving dispersion stability of the pigment particles dispersed with the polymer in the ink. That is, the polymer (a) may also contain a constitutional unit derived from the component (a-3) in addition to the constitutional unit derived from the component (a-1) and the constitutional unit derived from the component (a-2). Examples of the hydrophobic monomer (a-3) include alkyl (meth)acrylates, aromatic group-containing monomers, macromonomers and the like.

The alkyl (meth)acrylates are preferably those alkyl (meth)acrylates containing an alkyl group having not less than 1 and not more than 22 carbon atoms, and more preferably those alkyl (meth)acrylates containing an alkyl group having not less than 6 and not more than 18 carbon atoms. Examples of the alkyl (meth)acrylates include methyl (meth)acrylate, ethyl (meth)acrylate, (iso)propyl (meth)acrylate, (iso- or tert-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tert-)" and "(iso)" as used herein mean both the case of the presence of these groups and the case of absence of these groups in the structure of alkyl (meth)acrylates, and in the case of the absence of these groups the structure of alkyl (meth)acrylates are normal form.

The aromatic group-containing monomers are preferably in the form of a vinyl-based monomer containing an aromatic group having not less than 6 and not more than 22 carbon atoms which may contain a substituent group containing a hetero atom, and more preferably at least one monomer selected from the group consisting of a styrene-based monomer and an aromatic group-containing (meth)acrylate. The molecular weight of the aromatic group-containing monomers is preferably less than 500.

Examples of the preferred styrene-based monomer include styrene, 2-methyl styrene, α-methyl styrene, vinyl toluene and divinyl benzene. Among these styrene-based monomers, more preferred is styrene.

Examples of the preferred aromatic group-containing (meth)acrylate include benzyl (meth)acrylate and phenoxyethyl (meth)acrylate. Among these aromatic group-containing (meth)acrylates, more preferred is benzyl (meth)acrylate.

The macromonomer is in the form of a compound containing a polymerizable functional group at one terminal end thereof and having a number-average molecular weight of not less than 500 and not more than 100,000, and is preferably used as a monomer component of the polymer (a) from the viewpoint of improving dispersion stability of the pigment particles dispersed with the polymer in the ink. The polymerizable functional group bonded to one terminal end of the macromonomer is preferably an acryloyloxy group or a methacryloyloxy group and more preferably a methacryloyloxy group.

The macromonomer preferably has a number-average molecular weight of not less than 1,000 and not more than 10,000. Meanwhile, the number-average molecular weight of the macromonomer may be measured by gel permeation chromatography using chloroform containing 1 mmol/L of dodecyl dimethylamine as a solvent and using polystyrene as a reference standard substance.

As the macromonomer, from the viewpoint of improving dispersion stability of the pigment particles dispersed with the polymer in the ink, there are preferably used an aromatic group-containing macromonomer and a silicone-based macromonomer. Among these macromonomers, more preferred is the aromatic group-containing macromonomer.

Examples of an aromatic group-containing monomer constituting the aromatic group-containing macromonomer include the same aromatic group-containing monomers as described previously. Among these aromatic group-containing monomers, preferred are styrene and benzyl (meth)acrylate, and more preferred is styrene.

Specific examples of commercially available products of the styrene-based macromonomer include "AS-6(S)", "AN-6(S)" and "HS-6(S)" all available from Toagosei Co., Ltd., etc.

Specific examples of the silicone-based macromonomer include organopolysiloxanes containing a polymerizable functional group bonded to one terminal end thereof, etc.

As the component (a-3), there may be used any two or more of the aforementioned monomers, more specifically, any two or more monomers selected from the group consisting of the styrene monomer, the aromatic group-containing (meth)acrylate and the macromonomer may be used in combination with each other. In particular, the macromonomer is preferably used in combination with the other hydrophobic monomer.

The components (a-1) to (a-3) may be respectively used alone or in combination of any two or more thereof.

(Contents of Respective Components in Monomer Mixture A or Contents of Respective Constitutional Units in Polymer (a))

Upon production of the polymer (a), the contents of the aforementioned components (a-1) to (a-3) in the monomer mixture A (contents of non-neutralized components; hereinafter defined in the same way) or the contents of the constitutional units derived from the components (a-1) to (a-3) in the polymer (a) are as follows from the viewpoint of improving dispersion stability of the pigment particles dispersed with the polymer in the ink.

The content of the component (a-1) is preferably not less than 5% by mass, more preferably not less than 10% by mass and even more preferably not less than 15% by mass, and is also preferably not more than 40% by mass, more preferably not more than 30% by mass and even more preferably not more than 20% by mass.

The content of the component (a-2) is preferably not less than 20% by mass, more preferably not less than 40% by mass, even more preferably not less than 60% by mass and further even more preferably not less than 70% by mass, and is also preferably not more than 95% by mass, more preferably not more than 90% by mass and even more preferably not more than 85% by mass.

The content of the component (a-3) is preferably not more than 15% by mass, more preferably not more than 10% by mass, even more preferably not more than 5% by mass, further even more preferably not more than 1% by mass and still further even more preferably 0% by mass.

In addition, the mass ratio of the component (a-1) to the component (a-2) [component (a-1)/component (a-2)] is preferably not less than 0.01 and not more than 1, more preferably not less than 0.05 and not more than 0.60, and even more preferably not less than 0.10 and not more than 0.30.

Meanwhile, the ionic monomer (a-1) contains a dispersing group capable of exhibiting a charge repulsion effect in the ink (hereinafter also referred to merely as a "charge repulsion group"), and the nonionic monomer (a-2) contains a dispersing group capable of exhibiting a steric repulsion effect in the ink (hereinafter also referred to merely as a "steric repulsion group"). When using the ionic monomer (a-1) in combination with the nonionic monomer (a-2), it is possible to further enhance dispersion stability of the pigment particles dispersed with the polymer in the ink, so that the resulting ink can be improved in stability to thereby perform high-resolution printing owing to excellent leveling properties of the ink.

Water is a dispersing medium having a high dielectric constant which is capable of increasing charge repulsion of a dispersion to a highest level. When drying the ink, water will be first volatilized in many cases. When the amount of water in the dispersing medium such as water and a water-soluble organic solvent is reduced, the dispersion is considerably reduced in charge repulsion properties, so that the resulting ink tends to be deteriorated in stability. Under this circumstance, by using the ionic monomer (a-1) in combination with the nonionic monomer (a-2) to introduce a steric repulsion group into the polymer (a), even under such a condition in which water is volatilized, the dielectric constant of the dispersing medium is reduced and therefore the charge repulsion group of the polymer hardly acts effectively, it is possible to maintain high dispersion stability of the pigment particles dispersed with the polymer in the ink by the action of the nonionic group (steric repulsion group) thereof.

(Production of Polymer (a))

The aforementioned polymer (a) may be produced by copolymerizing the monomer mixture A by known polymerization methods. As the polymerization methods, preferred is a solution polymerization method.

The solvent used in the solution polymerization method is not particularly limited, and is preferably a polar solvent such as water, aliphatic alcohols having not less than 1 and not more than 3 carbon atoms, ketones, ethers and esters. Specific examples of the solvent include water, methanol, ethanol, acetone and methyl ethyl ketone. Of these solvents, preferred is water from the viewpoint of improving solubility of the polymer in the solvent.

The polymerization may be carried out in the presence of a polymerization initiator or a chain transfer agent. Examples of the polymerization initiator include persulfuric acid salts, water-soluble azo polymerization initiators, etc. Of these polymerization initiators, preferred are persulfuric acid salts such as ammonium persulfate and potassium persulfate. As the chain transfer agent, preferred are mercaptans, and more preferred is 2-mercaptoethanol.

The preferred polymerization conditions may vary depending upon the kind of polymerization initiator used, etc. From the viewpoint of improving reactivity of the polymerization initiator, the polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or an atmosphere of an inert gas such as argon.

After completion of the polymerization reaction, the polymer thus produced may be isolated from the reaction solution by conventionally known methods such as reprecipitation and removal of the solvent by distillation. In addition, the thus obtained polymer may be subjected to reprecipitation, membrane separation, chromatography, extraction, etc., for removing unreacted monomers, etc., therefrom.

The polymer (a) is preferably used as such in the form of a polymer solution without removing the solvent used in the polymerization reaction therefrom in order to use the solvent contained therein as a solvent in the below-mentioned step I from the viewpoint of enhancing productivity of a water dispersion of the pigment particles dispersed with the polymer.

The solid content of the polymer (a) solution is preferably not less than 30% by mass and more preferably not less than 40% by mass, and is also preferably not more than 60% by mass and more preferably not more than 50% by mass, from the viewpoint of enhancing productivity of a water dispersion of the pigment particles dispersed with the polymer.

The weight-average molecular weight of the polymer (a) used in the present invention is preferably not less than 20,000, more preferably not less than 30,000 and even more preferably not less than 50,000, and is also preferably not more than 500,000, more preferably not more than 300,000, even more preferably not more than 200,000 and further even more preferably not more than 100,000, from the viewpoint of improving dispersion stability of the pigment particles dispersed with the polymer in the ink as well as from the viewpoint of improving fixing strength of the ink to a printing substrate.

The acid value of the polymer (a) used in the present invention is preferably not less than 50 mgKOH/g, more preferably not less than 60 mgKOH/g, even more preferably not less than 70 mgKOH/g and further even more preferably not less than 80 mgKOH/g, and is also preferably not more than 140 mgKOH/g, more preferably not more than 130 mgKOH/g and even more preferably not more than 120 mgKOH/g, from the viewpoint of improving dispersibility of the pigment and adsorptivity of the polymer.

Meanwhile, the weight-average molecular weight and the acid value of the polymer may be measured by the methods described in Examples below.

(Production of Pigment Particles A Dispersed with Polymer)

The pigment particles A dispersed with the polymer (pigment particles A) as used in the present invention are in the form of particles formed by adsorbing the polymer (a) onto the surface of the pigment, so that the pigment can be stably dispersed in the ink with the polymer (a).

The pigment particles A can be efficiently produced in the form of a dispersion thereof by the process including the following step I.

Step I: subjecting a mixture containing the polymer (a), a solvent and the pigment (hereinafter also referred to merely as a "pigment mixture") to dispersion treatment to thereby obtain a dispersion of the pigment particles A (hereinafter also referred to merely as a "pigment dispersion").

Meanwhile, when producing the pigment particles A by the process including the step I, the pigment and the polymer (a) are not chemically bonded to each other, but are kept in such a state as irreversibly adsorbed onto each other, i.e., are present in the form of particles constituted of the pigment and the polymer which are always adsorbed onto each other in the ink. On the other hand, as described hereinlater, the ink may also contain "pigment-free polymer particles B" as a component thereof. However, the polymer particles B are different from the pigment particles A in that the former particles are in the form of particles containing no pigment.

Incidentally, the polymer (a) contained in the pigment particles A may be identical to or different from the polymer (b) contained in the polymer particles B. That is, the polymers (a) and (b) may be different in composition from each other, or may be identical to each other with respect to their characteristics including their composition except for only the presence or non-presence of the pigment therein.

The preferred combination of the polymer (a) and the polymer (b) is a combination of a water-soluble polymer having a pigment-dispersing capability as the polymer (a) and a pigment-free water-insoluble polymer as the polymer (b) from the viewpoint of improving leveling properties of the resulting ink.

In the case where the ink contains the pigment particles A and the polymer particles B, the content of the polymer in the ink as used herein means a total content of the polymer (a) and the polymer (b) in the ink.

(Step I)

In the step I, the polymer (a) is first dissolved in the solvent to prepare a solution of the polymer (a), and then the pigment, if required together with a neutralizing agent, a surfactant and the like, is added to and mixed in the resulting solution to obtain a pigment mixture. The order of addition of the respective components added to the solution of the polymer (a) is not particularly limited, and it is preferred that the neutralizing agent and the pigment are successively added to the solution in this order.

The solvent serving for dissolving the polymer (a) therein is not particularly limited. Examples of the preferred solvent include water, aliphatic alcohols having not less than 1 and not more than 3 carbon atoms, ketones, ethers, esters and the like. Of these solvents, more preferred are water and ketones, and even more preferred is water. When the polymer (a) is synthesized by a solution polymerization method, the solvent used in the polymerization method may be directly used as such in the step I.

In the case where the polymer (a) is an anionic polymer, an anionic group contained in the polymer (a) may be neutralized using a neutralizing agent. When using the neutralizing agent, the anionic group contained in the polymer (a) is neutralized such that the pH value of the dispersion of the polymer (a) obtained after being neutralized with the neutralizing agent preferably falls within the range of not less than 7 and not more than 11. Examples of the neutralizing agent include bases such as lithium hydroxide, sodium hydroxide, potassium hydroxide, ammonia and various amines. In addition, the polymer (a) may be previously neutralized.

The degree of neutralization of the anionic group in the polymer (a) is preferably not less than 0.3 mol, more preferably not less than 0.4 mol and even more preferably not less than 0.5 mol per 1 mol of the anionic group, and is also preferably not more than 3.0 mol, more preferably not more than 2.0 mol and even more preferably not more than 1.5 mol per 1 mol of the anionic group, from the viewpoint of improving dispersion stability of the pigment particles dispersed with the polymer in the ink and the pigment dispersion.

For example, in the case where the polymer (a) is an anionic polymer containing an anionic group, the degree of neutralization as described herein means the value obtained by dividing a mole equivalent of the neutralizing agent by a molar amount of the anionic group contained in the polymer (a).

(Contents of Respective Components in Pigment Mixture)

The content of the pigment in the pigment mixture is preferably not less than 10% by mass, more preferably not less than 20% by mass, even more preferably not less than 30% by mass and further even more preferably not less than 45% by mass, and is also preferably not more than 80% by mass, more preferably not more than 70% by mass, even more preferably not more than 60% by mass and further even more preferably not more than 55% by mass, from the viewpoint of improving dispersion stability of the pigment particles dispersed with the polymer in the ink and the pigment dispersion as well as from the viewpoint of enhancing productivity of the pigment dispersion.

The content of the polymer (a) in the pigment mixture is preferably not less than 0.1% by mass, more preferably not less than 0.15% by mass and even more preferably not less than 0.2% by mass, and is also preferably not more than 10% by mass, more preferably not more than 5% by mass, even more preferably not more than 3% by mass, further even more preferably not more than 1% by mass and still further even more preferably not more than 0.5% by mass, from the viewpoint of improving dispersion stability of the pigment dispersion as well as from the viewpoint of improving stability of the resulting ink.

The content of water in the pigment mixture is preferably not less than 40% by mass, more preferably not less than 45% by mass and even more preferably not less than 50% by mass, and is also preferably not more than 75% by mass, more preferably not more than 70% by mass and even more preferably not more than 65% by mass, from the viewpoint of improving dispersion stability of the pigment dispersion as well as from the viewpoint of enhancing productivity of the pigment dispersion.

When using the organic solvent in the step I, the content of the organic solvent in the pigment mixture is preferably not less than 10% by mass, more preferably not less than 12% by mass and even more preferably not less than 15% by mass, and is also preferably not more than 35% by mass, more preferably not more than 30% by mass and even more preferably not more than 25% by mass, from the viewpoint of improving wettability to the pigment and adsorptivity of the polymer to the pigment.

The mass ratio of the polymer (a) to the pigment [polymer (a)/pigment] in the pigment mixture is preferably from 0.2/99.8 to 70/30, more preferably from 0.5/99.5 to 60/40, even more preferably from 0.5/99.5 to 50/50 and further even more preferably from 0.5/99.5 to 40/60, from the viewpoint of improving dispersion stability of the pigment dispersion as well as from the viewpoint of improving stability of the resulting ink.

In the step I, the pigment mixture is further subjected to dispersion treatment to obtain the pigment dispersion. The dispersing method used for dispersing the aforementioned pigment mixture is not particularly limited. The pigment particles may be atomized into fine particles having a desired average particle size only by substantial dispersion treatment so that a shear stress acts on the pigment mixture. However, the pigment mixture may be first subjected to preliminary dispersion treatment, and then subjected to the substantial dispersion treatment by applying a shear stress thereto so as to control the average particle size of the pigment particles to a desired value.

When subjecting the pigment mixture to the preliminary dispersion treatment, there may be used ordinary mixing and stirring devices such as anchor blades and disper blades.

Examples of the dispersers that may be used in the aforementioned dispersion treatment include kneading machines such as roll mills and kneaders, high-pressure homogenizers such as "Microfluidizer" available from Microfluidics Corporation, and media-type dispersers such as paint shakers and beads mills. Examples of the commercially available media-type dispersers include "Ultra Apex Mill" available from Kotobuki Industries Co., Ltd., and "Pico Mill" available from Asada Iron Works Co., Ltd. These devices may be used in combination of any two or more thereof. Among these devices, the media-type dispersers are preferably used from the viewpoint of reducing the particle size of the pigment.

The temperature used in the dispersion treatment is preferably not lower than 10° C., more preferably not lower than 15° C. and even more preferably not lower than 18° C., and is also preferably not higher than 35° C., more preferably not higher than 30° C. and even more preferably not higher than 27° C., from the viewpoint of reducing the viscosity of the pigment dispersion.

The dispersing time used upon the dispersion treatment is preferably not less than 1 hour, more preferably not less than 2 hours and even more preferably not less than 3 hours, and is also preferably not more than 100 hours, more preferably not more than 50 hours and even more preferably not more than 25 hours, from the viewpoint of fully atomizing the pigment.

(Step II)

When using the organic solvent in the step I, the aforementioned production process may further include the following step II as an optional step in addition to the aforementioned step I.

Step II: removing the organic solvent from the dispersion obtained in the step I to thereby obtain a water dispersion of the pigment particles A.

The "water dispersion of the pigment particles A" obtained in the step II means a pigment dispersion formed by dispersing the pigment particles A in a dispersing medium containing water as a main medium.

In the step II, the organic solvent is removed from the dispersion obtained in the step I by any conventionally known methods to obtain a water dispersion of the pigment particles A. The organic solvent is preferably substantially completely removed from the thus obtained water dispersion containing the pigment particles A. However, the residual organic solvent may be present in the water dispersion unless the objects and advantageous effects of the present invention are adversely affected by the residual organic solvent. The content of the residual organic solvent in the water dispersion is preferably not more than 0.1% by weight and more preferably not more than 0.01% by weight.

In addition, if required, the dispersion may be subjected to heating and stirring treatments before removing the organic solvent therefrom by distillation.

(Step III)

Also, the pigment particles A may be produced by the process further including the following step III as an optional step in addition to the aforementioned step I and step II.

Step III: mixing the dispersion obtained in the step I or the water dispersion obtained in the step II with a crosslinking agent to subject the dispersion to crosslinking treatment, thereby obtaining a water dispersion of the crosslinked particles.

In the step III, in the case where the polymer (a) is an anionic polymer containing an anionic group, the crosslinking agent used in this step is preferably in the form of a compound containing a functional group that is capable of reacting with the anionic group of the polymer (a), more preferably a compound containing two or more functional groups that are capable of reacting with the anionic group of the polymer (a), in a molecule thereof, and even more preferably a compound containing not less than 2 and not more than 6 functional groups that are capable of reacting with the anionic group of the polymer (a), in a molecule thereof.

Suitable examples of the crosslinking agent include compounds containing two or more epoxy groups in a molecule thereof, compounds containing two or more oxazoline groups in a molecule thereof, and compounds containing two or more isocyanate groups in a molecule thereof. Among these crosslinking agents, preferred are the compounds containing two or more epoxy groups in a molecule thereof, and more preferred is trimethylolpropane polyglycidyl ether.

The concentration of the non-volatile components in the resulting pigment dispersion (solid content of the pigment dispersion) is preferably not less than 20% by mass and more preferably not less than 40% by mass, and is also preferably not more than 60% by mass and more preferably not more than 55% by mass, from the viewpoint of improving dispersion stability of the pigment dispersion as well as from the viewpoint of facilitating preparation of the ink.

In the case of a black ink and a chromatic ink, the average particle size of the pigment particles A in the pigment dispersion is preferably not less than 40 nm, more preferably not less than 60 nm and even more preferably not less than 80 nm from the viewpoint of performing high-resolution printing as well as from the viewpoint of enhancing productivity of the resulting ink, and is also preferably not more than 250 nm, more preferably not more than 220 nm, even more preferably not more than 200 nm and further even more preferably not more than 180 nm from the same viewpoint as described above.

In the case of a white ink, the average particle size of the pigment particles A in the pigment dispersion is preferably not less than 100 nm, more preferably not less than 150 nm and even more preferably not less than 200 nm from the viewpoint of improving concealing property of the resulting ink, and is also preferably not more than 600 nm, more preferably not more than 500 nm and even more preferably not more than 400 nm from the viewpoint of improving redispersibility of the resulting ink.

Meanwhile, the average particle size of the pigment particles A may be measured by the method described in Examples below.

The pigment particles A contained in the resulting ink are preferably free of swelling and contraction of the particles as well as flocculation between the particles. It is more preferred that the average particle size of the pigment particles A contained in the ink is the same as the average particle size of the pigment particles contained in the aforementioned pigment dispersion. The preferred range of the average particle size of the pigment particles A contained in the ink is also the same as the preferred range of the average particle size of the pigment particles contained in the aforementioned pigment dispersion.

The content of the pigment particles A in the ink is preferably not less than 1% by mass, more preferably not less than 3% by mass, even more preferably not less than 5% by mass, further even more preferably not less than 10% by mass and still further even more preferably not less than 15% by mass, and is also preferably not more than 40% by mass, more preferably not more than 35% by mass, even more preferably not more than 30% by mass and further even more preferably not more than 25% by mass, from the viewpoint of enhancing optical density of the resulting ink upon printing as well as improving fixing properties of the ink.

The content of the polymer (a) in the ink is preferably not less than 0.1% by mass, more preferably not less than 0.2% by mass and even more preferably not less than 0.3% by mass, and is also preferably not more than 10% by mass, more preferably not more than 5% by mass, even more preferably not more than 3% by mass, further even more preferably not more than 1% by mass and still further even more preferably not more than 0.8% by mass, from the viewpoint of improving fixing properties of the resulting ink.

The mass ratio of the polymer (a) to the pigment [polymer (a)/pigment] in the ink is preferably from 0.2/99.8 to 70/30, more preferably from 0.5/99.5 to 60/40, even more preferably from 1/99 to 50/50 and further even more preferably from 1/99 to 40/60, from the viewpoint of improving stability of the resulting ink.

(Pigment-Free Polymer Particles B)

The gravure ink of the present invention preferably contains pigment-free polymer particles B (polymer particles B) from the viewpoint of forming a film of the polymer on a printing substrate to improve fixing properties thereof. The polymer particles B are in the form of water-insoluble polymer particles constituted of a pigment-free polymer solely. Examples of a polymer (b) constituting the polymer particles B include acrylic resins, styrene-based resins, urethane-based resins, polyester-based resins, styrene-acrylic resins, butadiene-based resins, styrene-butadiene-based resins, vinyl chloride-based resins, vinyl chloride-acrylic resins, vinyl acetate-based resins and acrylic-silicone-based resins. Among these resins, from the viewpoint of promoting drying of the ink on a printing substrate and improving leveling properties of the ink, preferred are acrylic resins and vinyl chloride-acrylic resins, and more preferred is a combination of the acrylic resin and the vinyl chloride-acrylic resin.

In the case where the acrylic resin is used in combination with the vinyl chloride-acrylic resin, the mass ratio of the acrylic resin to the vinyl chloride-acrylic resin [acrylic resin/vinyl chloride-acrylic resin] is preferably from 1/100 to 100/100, more preferably from 3/100 to 70/100, even more preferably from 5/100 to 50/100 and further even more preferably from 10/100 to 30/100.

The polymer particles B may be present in the form of particles that are dispersed in water. The polymer particles B are preferably used in the form of a dispersion of the polymer particles B from the viewpoint of enhancing productivity of the ink. The polymer particles B used in the present invention may be either an appropriately synthesized product or a commercially available product.

[Polymer (b)]

The aforementioned acrylic resin is preferably a water-insoluble vinyl-based polymer that is produced by copolymerizing a monomer mixture B containing (b-1) an ionic monomer (hereinafter also referred to merely as a "component (b-1)") and (b-2) a hydrophobic monomer (hereinafter also referred to merely as a "component (b-2)") (such a mixture is hereinafter also referred to merely as a "monomer mixture B"). The vinyl-based polymer contains a constitutional unit derived from the component (b-1) and a constitutional unit derived from the component (b-2).

[(b-1) Ionic Monomer]

Examples of the component (b-1) include the same monomers as described above as to the component (a-1). Among these monomers, from the viewpoint of improving dispersion stability of the pigment-free polymer particles in the ink, preferred are anionic monomers, more preferred are carboxylic acid monomers, and even more preferred is at least one monomer selected from the group consisting of acrylic acid and methacrylic acid.

[(b-2) Hydrophobic Monomer]

Examples of the component (b-2) include the same alkyl (meth)acrylates, aromatic group-containing monomers and macromonomers as described above as to the component (a-3).

Among these monomers as the component (b-2), preferred are alkyl (meth)acrylates; more preferred are those alkyl (meth)acrylates containing an alkyl group having not less than 1 and not more than 22 carbon atoms; even more preferred are those alkyl (meth)acrylates containing an alkyl group having not less than 1 and not more than 10 carbon atoms; further even more preferred are methyl (meth)acrylate, ethyl (meth)acrylate, (iso)propyl (meth)acrylate, (iso- or tert-)butyl (meth)acrylate, (iso)amyl (meth)acrylate, cyclohexyl (meth)acrylate, 2-ethylhexyl (meth)acrylate, (iso)octyl (meth)acrylate and (iso)decyl (meth)acrylate; and still further even more preferred is a combination of methyl (meth)acrylate and 2-ethylhexyl (meth)acrylate.

These components (b-1) and (b-2) may be respectively used alone or in the form of a mixture of any two or more thereof.

(Contents of Respective Components in Monomer Mixture B or Contents of Respective Constitutional Units in Polymer (b))

Upon production of the polymer (b), the contents of the aforementioned components (b-1) and (b-2) in the monomer mixture B (contents of non-neutralized components; hereinafter defined in the same way) or the contents of the constitutional units derived from the components (b-1) and (b-2) in the polymer (b) are as follows.

The content of the component (b-1) is preferably not less than 1% by mass, more preferably not less than 3% by mass, even more preferably not less than 5% by mass and further even more preferably not less than 7% by mass, and is also preferably not more than 30% by mass, more preferably not more than 20% by mass, even more preferably not more than 15% by mass and further even more preferably not more than 10% by mass.

The content of the component (b-2) is preferably not less than 50% by mass, more preferably not less than 60% by mass, even more preferably not less than 70% by mass, further even more preferably not less than 80% by mass and still further even more preferably not less than 85% by mass, and is also preferably not more than 99% by mass, more preferably not more than 97% by mass, even more preferably not more than 95% by mass and further even more preferably not more than 93% by mass.

In addition, the mass ratio of the component (b-1) to the component (b-2) [component (b-1)/component (b-2)] is preferably not less than 0.01 and not more than 0.50, more preferably not less than 0.04 and not more than 0.40 and even more preferably not less than 0.08 and not more than 0.20.

The polymer (b) may be produced by copolymerizing the mixture of the monomers by known polymerization methods. Examples of the preferred polymerization methods include an emulsion polymerization method and a suspension polymerization method, etc. Among these polymerization methods, more preferred is an emulsion polymerization method.

The polymerization may be carried out in the presence of a polymerization initiator. Examples of the polymerization initiator include persulfuric acid salts and water-soluble azo polymerization initiators. Of these polymerization initiators, more preferred are persulfuric acid salts such as ammonium persulfate and potassium persulfate.

Upon conducting the polymerization reaction, a surfactant may also be used therein. Examples of the surfactant include a nonionic surfactant, an anionic surfactant, a cationic surfactant and the like. Of these surfactants, from the viewpoint of improving dispersion stability of the polymer particles, preferred is an anionic surfactant. Examples of the anionic surfactant include fatty acid salts, alkylbenzenesulfuric acid salts, polyoxyethylene alkylphenylethersulfuric acid ester salts, polyoxyethylene aralkylarylethersulfuric acid ester salts, polyoxyethylene alkylethersulfuric acid ester salts and the like. Of these anionic surfactants, preferred are polyoxyethylene alkylethersulfuric acid ester salts.

The preferred polymerization conditions may vary depending upon the kind of polymerization initiator used, etc. The polymerization temperature is preferably not lower than 50° C. and not higher than 90° C., and the polymerization time is preferably not less than 1 hour and not more than 20 hours. In addition, the polymerization is preferably conducted in a nitrogen gas atmosphere or an atmosphere of an inert gas such as argon.

After completion of the polymerization reaction, the polymer (b) thus produced may be isolated from the reaction solution by a known method such as reprecipitation and removal of the solvent by distillation. In addition, the thus obtained polymer (b) may be further subjected to reprecipitation, membrane separation, chromatography, extraction, etc., for removing unreacted monomers, etc., therefrom.

The polymer (b) is preferably used as such in the form of a dispersion formed by dispersing the polymer particles B in a dispersing medium containing water as a main medium, without removing the solvent used in the polymerization reaction from the dispersion from the viewpoint of well compounding the polymer particles B, etc., in the resulting ink.

Examples of commercially available products of the dispersion of the polymer particles B include acrylic resins such as "Neocryl A1127" (anionic self-crosslinkable aqueous acrylic resin) available from DSM NeoResins, Inc., and "JONCRYL 390" available from BASF Japan, Ltd.; urethane-based resins such as "WBR-2018" and "WBR-2000U" both available from Taisei Fine Chemical Co., Ltd.; styrene-butadiene resins such as "SR-100" and "SR102" both available from Nippon A & L Inc.; styrene-acrylic resins such as "JONCRYL 7100", "JONCRYL 734" and "JONCRYL 538" all available from BASF Japan, Ltd.; and vinyl chloride-acrylic resins such as "VINYBLAN 700" and "VINYBLAN 701" both available from Nissin Chemical Co., Ltd., etc.

The concentration of the non-volatile components in the dispersion of the polymer particles B (solid content of the dispersion of the polymer particles B) is preferably not less than 20% by mass and more preferably not less than 30% by mass, and is also preferably not more than 60% by mass and more preferably not more than 55% by mass, from the viewpoint of improving dispersion stability of the dispersion as well as from the viewpoint of facilitating preparation of the ink.

The average particle size of the polymer particles B in the dispersion or the ink is preferably not less than 10 nm, more preferably not less than 20 nm and even more preferably not less than 30 nm, and is also preferably not more than 300 nm, more preferably not more than 200 nm, even more preferably not more than 150 nm and further even more preferably not more than 130 nm, from the viewpoint of improving stability of the resulting ink.

Meanwhile, the average particle size of the polymer particles B may be measured by the method described in Examples below.

The weight-average molecular weight of the polymer (b) used in the present invention is preferably not less than 100,000, more preferably not less than 200,000 and even more preferably not less than 300,000, and is also preferably not more than 2,500,000, more preferably not more than 1,000,000 and even more preferably not more than 600,000, from the viewpoint of improving fixing properties of the resulting ink.

The acid value of the polymer (b) used in the present invention is preferably not less than 1 mgKOH/g, more preferably not less than 3 mgKOH/g and even more preferably not less than 5 mgKOH/g, and is also preferably not more than 70 mgKOH/g, more preferably not more than 65 mgKOH/g and even more preferably not more than 60 mgKOH/g, from the viewpoint of improving stability of the resulting ink.

Meanwhile, the weight-average molecular weight and the acid value of the polymer (b) may be measured by the methods described in Examples below.

The content of the polymer particles B in the ink is preferably not less than 1% by mass, more preferably not less than 3% by mass, even more preferably not less than 5% by mass and further even more preferably not less than 10% by mass, and is also preferably not more than 30% by mass, more preferably not more than 20% by mass and even more preferably not more than 15% by mass, from the viewpoint of improving fixing properties of the resulting ink. Incidentally, when the content of the polymer particles B in the ink is not less than the lower limit of the aforementioned range, the resulting ink can be improved in fixing properties, whereas when the content of the polymer particles B in the ink is not more than the upper limit of the aforementioned range, the resulting ink can be prevented from suffering from deterioration in stability The mass ratio of the polymer (a sum of the polymer (a) and the polymer (b)) to the pigment [polymer/pigment] in the ink of the present invention is preferably from 20/100 to 300/100, more preferably from 30/100 to 200/100, even more preferably from 40/100 to 100/100 and further even more preferably from 50/100 to 80/100, from the viewpoint of improving stability of the resulting ink.

<Water-Soluble Organic Solvent>

The water-soluble organic solvent used in the present invention may be present in the form of either a liquid or a solid at an ordinary temperature (25° C.). The water-soluble organic solvent as used herein means an organic solvent having a solubility in water of not less than 10 mL as measured by dissolving the organic solvent in 100 mL of water at 25° C.

The total content of the water-soluble organic solvent in the ink is preferably not less than 1% by mass, more preferably not less than 2% by mass and even more preferably not less than 4% by mass from the viewpoint of improving leveling properties of the resulting ink, and is also not more than 15% by mass, preferably not more than 10% by mass, more preferably not more than 9% by mass and even more preferably not more than 8% by mass from the viewpoint of reducing a burden on the environment.

The boiling point of the water-soluble organic solvent is preferably not lower than 100° C., more preferably not lower than 110° C., even more preferably not lower than 115° C., further even more preferably not lower than 120° C. and still further even more preferably not lower than 130° C., and is also preferably not higher than 260° C., more preferably not higher than 240° C., even more preferably not higher than 230° C., further even more preferably not higher than 220° C. and still further even more preferably not higher than 200° C., from the viewpoint of improving leveling properties of the resulting ink. The "boiling point" as used herein represents a standard boiling point (boiling point as measured at 1 atm). In the case where two or more water-soluble organic solvents are used as the aforementioned water-soluble organic solvent, the boiling point of the water-soluble organic solvent means a weighted mean value of boiling points of the two or more water-soluble organic solvents which are weighted by contents (% by mass) of the respective water-soluble organic solvents contained therein.

The ink of the present invention may also contain a water-soluble organic solvent having a boiling point of lower than 100° C. or higher than 260° C.

Examples of the water-soluble organic solvent having a boiling point of lower than 100° C. include monohydric alcohols such as ethanol, 2-propanol (isopropyl alcohol) and 1-propanol (n-propyl alcohol), etc.

Examples of the water-soluble organic solvent having a boiling point of higher than 260° C. include triethylene glycol (boiling point (b.p.) 285° C.), tripropylene glycol (b.p. 273° C.), glycerin (b.p. 290° C.), etc.

The content of the water-soluble organic solvent having a boiling point of lower than 100° C. in the ink is preferably less than 5% by mass, more preferably less than 3% by mass and even more preferably less than 1% by mass from the viewpoint of improving leveling properties of the resulting ink. The lower limit of the content of the water-soluble organic solvent having a boiling point of lower than 100° C. in the ink is 0% by mass. When the content of the water-soluble organic solvent having a boiling point of lower than 100° C. in the ink is less than 5% by mass, preferably less than 3% by mass, it is possible to suppress drying properties of the ink. In this case, since an additional amount of the solvent is not needed, it is possible to decrease an amount of high-volatile organic compounds used and therefore reduce the burden on the environment.

The content of the water-soluble organic solvent having a boiling point of higher than 260° C. in the ink is preferably not more than 5% by mass, more preferably not more than 3% by mass and even more preferably not more than 1% by mass from the viewpoint of improving leveling properties of the resulting ink.

The water-soluble organic solvent contains a glycol ether having a boiling point of not lower than 100° C. and not higher than 260° C. from the viewpoint of improving leveling properties of the resulting ink.

The molecular weight of the glycol ether is preferably not less than 70, more preferably not less than 80 and even more preferably not less than 100, and is also preferably not more than 200, more preferably not more than 190 and even more preferably not more than 180.

The boiling point of the aforementioned glycol ether is preferably not lower than 110° C., more preferably not lower than 115° C., even more preferably not lower than 120° C. and further even more preferably not lower than 130° C., and is also preferably not higher than 240° C., more preferably not higher than 230° C., even more preferably not higher than 220° C., further even more preferably not higher than 200° C. and still further even more preferably not higher than 180° C., from the viewpoint of improving leveling properties of the resulting ink. The "boiling point" of the glycol ether as used herein represents a standard boiling point (boiling point as measured at 1 atm). In the case where two or more glycol ethers are used as the aforementioned glycol ether, the boiling point of the glycol ether means a weighted mean value of boiling points of the two or more glycol ethers which are weighted by contents (% by mass) of the respective glycol ethers contained therein.

The content of the glycol ether in the ink is not less than 1% by mass, preferably not less than 2% by mass and more preferably not less than 4% by mass from the viewpoint of improving leveling properties of the resulting ink, and is also not more than 10% by mass, preferably not more than 9% by mass, more preferably not more than 8% by mass, even more preferably not more than 7% by mass and further even more preferably not more than 5% by mass from the viewpoint of improving leveling properties of the resulting ink.

The mass ratio of the glycol ether to a whole amount of the water-soluble organic solvent used [glycol ether/whole amount of water-soluble organic solvent] in the ink is preferably from 5/10 to 10/10, more preferably from 6/10 to 10/10 and even more preferably from 7/10 to 10/10.

Examples of the glycol ether include alkylene glycol monoalkyl ethers and alkylene glycol dialkyl ethers.

The number of carbon atoms of an alkyl group contained in the aforementioned glycol ether is preferably not less than 1 and more preferably not less than 2, and is also preferably not more than 6, more preferably not more than 4 and even more preferably not more than 3. The alkyl group may be in the form of either a straight chain or a branched chain.

Specific examples of the alkylene glycol monoalkyl ethers include ethylene glycol monoalkyl ethers such as ethylene glycol monomethyl ether (125° C.), ethylene glycol monoisopropyl ether (142° C.), ethylene glycol monobutyl ether (171° C.) and ethylene glycol monoisobutyl ether (161° C.);

diethylene glycol monoalkyl ethers such as diethylene glycol monomethyl ether (194° C.), diethylene glycol monoisopropyl ether (207° C.), diethylene glycol monobutyl ether (231° C.) and diethylene glycol monoisobutyl ether (220° C.); propylene glycol monoalkyl ethers such as propylene glycol monomethyl ether (121° C.) and propylene glycol monopropyl ether (150° C.); dipropylene glycol monoalkyl ethers such as dipropylene glycol monomethyl ether (187° C.); and tripropylene glycol monoalkyl ethers such as tripropylene glycol monomethyl ether (220° C.).

Specific examples of the alkylene glycol dialkyl ethers include diethylene glycol dimethyl ether (162° C.), diethylene glycol methyl ethyl ether (176° C.), diethylene glycol diethyl ether (189° C.), triethylene glycol dimethyl ether (216° C.), etc. Meanwhile, the aforementioned numeral values in the parentheses represent boiling points of the respective glycol ethers. These glycol ethers may be used alone or in combination of any two or more thereof.

Of these glycol ethers, from the viewpoint of improving drying properties and leveling properties of the resulting ink, preferred is at least one compound selected from the group consisting of alkylene glycol monoalkyl ethers and alkylene glycol dialkyl ethers, and more preferred are alkylene glycol monoalkyl ethers. More specifically, from the same viewpoint as described above, even more preferred is at least one compound selected from the group consisting of ethylene glycol monomethyl ether, ethylene glycol monoisopropyl ether, ethylene glycol monobutyl ether, diethylene glycol monomethyl ether, diethylene glycol monoisopropyl ether, diethylene glycol monobutyl ether, diethylene glycol monoisobutyl ether, dipropylene glycol monomethyl ether, tripropylene glycol monomethyl ether, diethylene glycol dimethyl ether, diethylene glycol methyl ethyl ether and diethylene glycol diethyl ether; further even more preferred is at least one compound selected from the group consisting of ethylene glycol monomethyl ether, ethylene glycol monoisopropyl ether, ethylene glycol monobutyl ether, diethylene glycol monomethyl ether, diethylene glycol monoisopropyl ether, diethylene glycol monobutyl ether and diethylene glycol monoisobutyl ether; and still further even more preferred is at least one compound selected from the group consisting of ethylene glycol monomethyl ether, ethylene glycol monoisopropyl ether and ethylene glycol monobutyl ether.

The water-soluble organic solvent used in the present invention preferably further contains the other water-soluble organic solvents than the aforementioned glycol ethers. Examples of the other water-soluble organic solvents include alcohols, divalent or higher-valent polyhydric alcohols such as glycols, pyrrolidones such as N-methyl-2-pyrrolidone and 2-pyrrolidone, alkanol amines, etc. Of these other water-soluble organic solvents, preferred are glycols from the viewpoint of improving leveling properties of the resulting ink.

The boiling point of the aforementioned respective glycols is preferably not lower than 100° C., more preferably not lower than 110° C., even more preferably not lower than 115° C., further even more preferably not lower than 120° C. and still further even more preferably not lower than 130° C., and is also preferably not higher than 260° C., more preferably not higher than 240° C., even more preferably not higher than 230° C., further even more preferably not higher than 220° C. and still further even more preferably not higher than 200° C., from the viewpoint of improving leveling properties of the resulting ink. The "boiling point" of the glycol as used herein represents a standard boiling point (boiling point as measured at 1 atm). In the case where two or more glycols are used as the aforementioned glycol, the boiling point of the glycol means a weighted mean value of boiling points of the two or more glycols which are weighted by contents (% by mass) of the respective glycols.

Examples of the glycols include 1,2-alkanediols containing not less than 2 and not more than 10 carbon atoms such as ethylene glycol (197° C.), propylene glycol (1,2-propanediol; 188° C.), 1,2-butanediol (194° C.), 1,2-pentanediol (210° C.), 1,2-hexanediol (224° C.), 1,2-octanediol (131° C.) and 1,2-decanediol (255° C.); 1,3-alkanediols containing not less than 3 and not more than 8 carbon atoms such as 1,3-propanediol (230° C.), 2-methyl-1,3-propanediol (214° C.), 3-methyl-1,3-butanediol (203° C.) and 2-ethyl-1,3-hexanediol (244° C.); and polyalkylene glycols such as dipropylene glycol (231° C.) and diethylene glycol (244° C.). Meanwhile, the aforementioned numeral values in the parentheses represent boiling points of the respective glycols. These glycols may be used alone or in combination of any two or more thereof. Of these glycols, from the viewpoint of improving drying properties and leveling properties of the resulting ink, preferred are 1,2-alkanediols containing not less than 2 and not more than 10 carbon atoms; more preferred are 1,2-alkanediols containing not less than 2 and not more than 6 carbon atoms; even more preferred are 1,2-alkanediols containing not less than 2 and not more than 4 carbon atoms; and further even more preferred is propylene glycol.

The content of the aforementioned glycol in the ink is preferably not less than 0.5% by mass, more preferably not less than 1% by mass and even more preferably not less than 2% by mass, and is also preferably not more than 8% by mass, more preferably not more than 6% by mass and even more preferably not more than 4% by mass, from the viewpoint of improving leveling properties of the resulting ink.

In the case where the aforementioned glycol ether and glycol are used in combination with each other, the mass ratio of the glycol to the glycol ether [glycol/glycol ether] in the ink is preferably from 10/90 to 70/30, more preferably from 20/80 to 60/40, even more preferably from 30/70 to 50/50 and further even more preferably from 30/70 to 40/60.

<Surfactant>

The surfactant used in the present invention contains an acetylene glycol-based surfactant.

As the acetylene glycol-based surfactant, from the viewpoint of improving leveling properties of the resulting ink, preferred are an acetylene glycol containing not less than 8 and not more than 22 carbon atoms and an ethylene adduct of the acetylene glycol, and more preferred is the acetylene glycol containing not less than 8 and not more than 22 carbon atoms. The number of carbon atoms contained in the aforementioned acetylene glycol is preferably not less than 10 and more preferably not less than 12, and is also preferably not more than 20, more preferably not more than 18 and even more preferably not more than 16. More specifically, from the viewpoint of improving leveling properties of the resulting ink, as the acetylene glycol-based surfactant, there may be mentioned at least one acetylene glycol selected from the group consisting of 2,4,7,9-tetramethyl-5-decyne-4,7-diol, 3,6-dimethyl-4-octyne-3,6-diol and 2,5-dimethyl-3-hexyne-2,5-diol, and an ethyleneoxide adduct of the acetylene glycol. Of these compounds, preferred is 2,4,7,9-tetramethyl-5-decyne-4,7-diol.

The HLB (Hydrophilic-Lipophilic Balance) value of the acetylene glycol-based surfactant is preferably not less than 0, more preferably not less than 1, even more preferably not less than 2 and further even more preferably not less than 2.5, and is also preferably not more than 5, more preferably not more than 4.5, even more preferably not more than 4 and further even more preferably not more than 3.5.

These acetylene glycol-based surfactants may be used alone or in combination of any two or more thereof.

Specific examples of commercially available products of the acetylene glycol-based surfactant include "SURFYNOL 104" (2,4,7,9-tetramethyl-5-decyne-4,7-diol; HLB: 3.0), "SURFYNOL 104E" (a 50% ethylene glycol-diluted solution of 2,4,7,9-tetramethyl-5-decyne-4,7-diol), "SURFYNOL 104PG-50" (a 50% propylene glycol-diluted solution of 2,4,7,9-tetramethyl-5-decyne-4,7-diol) and "SURFYNOL 420" (an adduct of 2,4,7,9-tetramethyl-5-decyne-4,7-diol with 1.3 mol (on average) of EO; HLB: 4.7) all available from Air Products & Chemicals, Inc., and "ACETYLENOL E13T" (average molar number of addition of EO: 1.3; HLB: 4.7) available from Kawaken Fine Chemicals Co., Ltd.

The surfactant used in the present invention may also contain the other surfactants than the aforementioned acetylene glycol-based surfactant. Examples of the preferred other surfactants include at least one surfactant selected from the group consisting of a anionic surfactant, a nonionic surfactant other than the acetylene glycol-based surfactant and an ampholytic surfactant. These other surfactants may be used in combination of any two or more thereof.

Of these other surfactants, from the viewpoint of improving leveling properties of the resulting ink, preferred is the nonionic surfactant other than the acetylene glycol-based surfactant. Examples of the aforementioned nonionic surfactant include an alcohol-based surfactant and a silicone-based surfactant. These surfactants may be used in combination of any two or more thereof. Among these surfactants, from the viewpoint of improving wettability of the ink to a printing substrate, preferred is the silicone-based surfactant.

As the alcohol-based surfactant, from the viewpoint of improving wettability of the ink to a printing substrate, preferred is an alkyleneoxide adduct of an alcohol containing not less than 6 and not more than 30 carbon atoms. Examples of the alcohol include monohydric alcohols. From the same viewpoint as described above, the number of carbon atoms contained in the alcohol is preferably not less than 8, more preferably not less than 10 and even more preferably not less than 12, and is also preferably not more than 24, more preferably not more than 22 and even more preferably not more than 20.

As the alkyleneoxide adduct of the alcohol, from the same viewpoint as described above, preferred are an ethyleneoxide adduct of the alcohol and an ethyleneoxide/propyleneoxide adduct of the alcohol, and more preferred is an ethyleneoxide adduct of the alcohol.

Specific examples of commercially available products of the alcohol-based surfactant include "EMULGEN 108" (HLB: 12.1; average molar number of addition of EO: 6), "EMULGEN 109P" (HLB: 13.6; average molar number of addition of EO: 8), "EMULGEN 120" (HLB: 15.3; average molar number of addition of EO: 13), "EMULGEN 147" (HLB: 16.3; average molar number of addition of EO: 17) and "EMULGEN 150" (HLB: 18.4; average molar number of addition of EO: 44) as ethyleneoxide adducts of lauryl alcohol all available from Kao Corporation, as well as "EMULGEN 707" (an ethyleneoxide adduct of a secondary alcohol containing from 11 to 15 carbon atoms; HLB: 12.1; average molar number of addition of EO: 6) and "EMULGEN 220" (an ethyleneoxide adduct of a linear primary alcohol containing from 16 to 18 carbon atoms; HLB: 14.2; average molar number of addition of EO: 13) both available from Kao Corporation, etc.

Examples of the silicone-based surfactant include dimethyl polysiloxane, polyether-modified silicones, amino-modified silicones, carboxy-modified silicones, methylphenyl polysiloxane, fatty acid-modified silicones, alcohol-modified silicones, aliphatic alcohol-modified silicones, epoxy-modified silicones, fluorine-modified silicones, cyclic silicones, alkyl-modified silicones, etc. Of these silicone-based surfactants, polyether-modified silicones are preferred from the viewpoint of improving wettability of the ink to a printing substrate.

Specific examples of the polyether-modified silicones include PEG-3 dimethicone, PEG-9 dimethicone, PEG-9PEG-9 dimethicone, PEG-9 methyl ether dimethicone, PEG-10 dimethicone, PEG-11 methyl ether dimethicone, PEG/PPG-20/22 butyl ether dimethicone, PEG-32 methyl ether dimethicone, PEG-9 polydimethylsiloxy ethyl dimethicone, lauryl PEG-9 polydimethylsiloxy ethyl dimethicone, etc. Of these the polyether-modified silicones, especially preferred is PEG-11 methyl ether dimethicone.

Specific examples of commercially available products of the silicone-based surfactant include "KF-6011", "KF-6012", "KF-6013", KF-6015", "KF-6016", "KF-6017", "KF-6028", "KF-6038" and "KF-6043" all available from Shin-Etsu Chemical Co., Ltd., etc.

The content of the surfactant in the ink is preferably not less than 0.01% by mass, more preferably not less than 0.1% by mass and even more preferably not less than 0.2% by mass, and is also preferably not more than 5% by mass, more preferably not more than 4% by mass and even more preferably not more than 3% by mass, from the viewpoint of improving wettability of the ink to a printing substrate.

The content of the acetylene glycol-based surfactant in the ink is preferably not less than 0.3% by mass, more preferably not less than 0.5% by mass and even more preferably not less than 0.7% by mass, and is also preferably not more than 5% by mass, more preferably not more than 4% by mass and even more preferably not more than 3% by mass, from the viewpoint of improving wettability of the ink to a printing substrate.

The mass ratio of the acetylene glycol-based surfactant to a whole amount of the surfactant [acetylene glycol-based surfactant/whole amount of surfactant] in the ink is preferably from 1/10 to 10/10, more preferably from 5/10 to 10/10 and even more preferably from 7/10 to 10/10.

<Water>

The content of water in the ink is not less than 50% by mass, preferably not less than 52% by mass and more preferably not less than 55% by mass from the viewpoint of improving leveling properties of the resulting ink while reducing an amount of volatile organic compounds used therein, and is also not more than 70% by mass, preferably not more than 68% by mass and more preferably not more than 65% by mass from the viewpoint of improving leveling properties of the resulting ink while maintaining good drying properties thereof. In the case where the ink contains an optional component other than the pigment, the polymer, the water-soluble organic solvent, the surfactant and water, a part of the content of water in the ink may be replaced with the other component.

The ink of the present invention may also contain various additives as optional components, such as a pH modifier, a viscosity controller, a defoaming agent, an antiseptic agent and a rust preventive.

The viscosity of the ink as measured at 20° C. is preferably not less than 10 seconds, more preferably not less than 12 seconds and even more preferably not less than 14 seconds from the viewpoint of improving leveling properties of the resulting ink, and is also preferably not more than 25 seconds, more preferably not more than 23 seconds and even more preferably not more than 21 seconds from the same viewpoint as described above. The viscosity of the ink as measured at 20° C. may be measured using a Zahn cup viscometer (No. 3) by the method described in Examples below. Meanwhile, the aforementioned viscosity of the ink is the viscosity as measured upon conducting the gravure printing.

The pH value of the ink as measured at 20° C. is preferably not less than 5.5, more preferably not less than 6.0, even more preferably not less than 6.5 and further even more preferably not less than 7.0 from the viewpoint of improving dispersion stability of the resulting ink, and is also preferably not more than 11.0, more preferably not more than 10.0, even more preferably not more than 9.5 and further even more preferably not more than 9.0 from the viewpoint of improving the resistance of members to the ink and suppressing skin irritation. The pH value of the ink as measured at 20° C. may be measured by the method described in Examples below.

[Gravure Printing Method]

The ink of the present invention can be suitably used in gravure printing using a gravure printing plate. When using the ink of the present invention to print characters or images on a printing substrate by a gravure printing method, it is possible to obtain s high-resolution gravure printed material owing to excellent leveling properties of the ink.

The gravure printing is such a printing method as mentioned hereinunder. That is, while rotating a gravure cylinder (a gravure printing plate) on a surface of which recessed cells are formed, the aforementioned ink is fed over the surface of the gravure cylinder, and scraped off therefrom by a doctor blade fixedly mounted at a predetermined position to allow the ink to remain only within the cells. Then, a printing substrate continuously fed towards the gravure cylinder is pressure-contacted over the surface of the gravure cylinder by means of an impression cylinder whose surface is formed of a rubber to thereby transfer only the ink in the cells of the gravure cylinder to the printing substrate and thereby print characters or images on the printing substrate.

It is not necessary to dilute the ink of the present invention with a solvent upon the gravure printing, and the upper limit of the whole amount of the water-soluble organic solvent contained in the ink is 15% by mass. Therefore, the ink of the present invention is capable of reducing a burden on the environment.

(Printing Substrate)

Examples of the printing substrate used in the gravure printing include papers such as a coated paper, an art paper, a synthetic paper and a processed paper; and resin films such as a polyester film, a polyethylene film, a polypropylene film, a polystyrene film, a vinyl chloride film and a nylon film. Of these printing substrates, from the viewpoint of enhancing optical density of the ink upon printing, preferred are the resin films. In addition, from the viewpoint of improving suitability to after-processing treatments such as punching treatment of the resulting printed material, preferred are a polyester film and a polypropylene film. From the viewpoint of improving gravure printability, there may also be used such a resin film whose surface is subjected to electrical discharge treatments such as corona treatment and plasma treatment.

With respect to the aforementioned embodiments, the present invention further provides the following aspects relating to the aqueous gravure ink.

<1> An aqueous gravure ink containing a pigment, a polymer, a water-soluble organic solvent, a surfactant and water, in which the water-soluble organic solvent contains a glycol ether having a boiling point of not lower than 100° C. and not higher than 260° C., and a content of the glycol ether in the ink is not less than 1% by mass and not more than 10% by mass;

a total content of the water-soluble organic solvent in the ink is not more than 15% by mass;

the surfactant contains an acetylene glycol-based surfactant; and a content of water in the ink is not less than 50% by mass and not more than 70% by mass.

<2> The aqueous gravure ink according to the aspect <1>, wherein a content of the pigment in the ink is preferably not less than 1% by mass, more preferably not less than 2% by mass, even more preferably not less than 3% by mass, further even more preferably not less than 5% by mass, still further even more preferably not less than 10% by mass and furthermore preferably not less than 15% by mass, and is also preferably not more than 30% by mass, more preferably not more than 25% by mass and even more preferably not more than 20% by mass.

<3> The aqueous gravure ink according to the aspect <1> or <2>, wherein the polymer is a vinyl-based polymer.

<4> The aqueous gravure ink according to any one of the aspects <1> to <3>, wherein a content of the polymer in the ink is preferably not less than 3% by mass, more preferably not less than 5% by mass, even more preferably not less than 7% by mass and further even more preferably not less than 10% by mass, and is also preferably not more than 38% by mass, more preferably not more than 30% by mass, even more preferably not more than 25% by mass, further even more preferably not more than 20% by mass and still further even more preferably not more than 15% by mass.

<5> The aqueous gravure ink according to any one of the aspects <1> to <4>, wherein the pigment is in the form of pigment particles A dispersed with the polymer.

<6> The aqueous gravure ink according to the aspect <5>, wherein a polymer (a) constituting the pigment particles A is in the from of a water-soluble vinyl-based polymer that contains a constitutional unit derived from (a-1) an ionic monomer and a constitutional unit derived from (a-2) a nonionic monomer.

<7> The aqueous gravure ink according to the aspect <6>, wherein the polymer (a) is in the from of the vinyl-based polymer that further contains a constitutional unit derived from (a-3) a hydrophobic monomer.

<8> The aqueous gravure ink according to any one of the aspects <5> to <7>, wherein a content of the pigment particles A in the ink is preferably not less than 1% by mass, more preferably not less than 3% by mass, even more preferably not less than 5% by mass, further even more preferably not less than 10% by mass and still further even more preferably not less than 15% by mass, and is also preferably not more than 40% by mass, more preferably not more than 35% by mass, even more preferably not more than 30% by mass and further even more preferably not more than 25% by mass.

<9> The aqueous gravure ink according to any one of the aspects <6> to <8>, wherein a content of the polymer (a) in the ink is preferably not less than 0.1% by mass, more preferably not less than 0.2% by mass and even more preferably not less than 0.3% by mass, and is also preferably not more than 10% by mass, more preferably not more than 5% by mass, even more preferably not more than 3% by mass, further even more preferably not more than 1% by mass and still further even more preferably not more than 0.8% by mass.

<10> The aqueous gravure ink according to any one of the aspects <6> to <9>, wherein a mass ratio of the polymer (a) to the pigment [polymer (a)/pigment] in the ink is preferably from 0.2/99.8 to 70/30, more preferably from 0.5/99.5 to 60/40, even more preferably from 1/99 to 50/50 and further even more preferably from 1/99 to 40/60.

<11> The aqueous gravure ink according to any one of the aspects <1> to <10>, further containing pigment-free water-insoluble polymer particles B.

<12> The aqueous gravure ink according to the aspect <11>, wherein a polymer (b) constituting the polymer particles B is preferably at least one resin selected from the group consisting of an acrylic resin and a vinyl chloride-acrylic resin.

<13> The aqueous gravure ink according to the aspect <12>, wherein the acrylic resin is in the form of a water-insoluble vinyl-based polymer containing a constitutional unit derived from (b-1) an ionic monomer and a constitutional unit derived from (b-2) a hydrophobic monomer.

<14> The aqueous gravure ink according to any one of the aspects <11> to <13>, wherein a content of the polymer particles B in the ink is preferably not less than 1% by mass, more preferably not less than 3% by mass, even more preferably not less than 5% by mass and further even more preferably not less than 10% by mass, and is also preferably not more than 30% by mass, more preferably not more than 20% by mass and even more preferably not more than 15% by mass.

<15> The aqueous gravure ink according to any one of the aspects <12> to <14>, wherein a mass ratio of the polymer (a sum of the polymer (a) and the polymer (b)) to the pigment [polymer/pigment] in the ink is preferably from 20/100 to 300/100, more preferably from 30/100 to 200/100, even more preferably from 40/100 to 100/100 and further even more preferably from 50/100 to 80/100.

<16> The aqueous gravure ink according to any one of the aspects <1> to <15>, wherein a boiling point of the glycol ether is preferably not lower than 110° C., more preferably not lower than 115° C., even more preferably not lower than 120° C. and further even more preferably not lower than 130° C., and is also preferably not higher than 240° C., more preferably not higher than 230° C., even more preferably not higher than 220° C., further even more preferably not higher than 200° C. and still further even more preferably not higher than 180° C.

<17> The aqueous gravure ink according to any one of the aspects <1> to <16>, wherein a content of the glycol ether in the ink is preferably not less than 2% by mass and more preferably not less than 4% by mass, and is also preferably not more than 9% by mass, more preferably not more than 8% by mass, even more preferably not more than 7% by mass and further even more preferably not more than 5% by mass.

<18> The aqueous gravure ink according to any one of the aspects <1> to <17>, wherein a total content of the water-soluble organic solvent in the ink is preferably not less than 1% by mass, more preferably not less than 2% by mass and even more preferably not less than 4% by mass, and is also preferably not more than 10% by mass, more preferably not more than 9% by mass and even more preferably not more than 8% by mass.

<19> The aqueous gravure ink according to any one of the aspects <1> to <18>, wherein a content of the water-soluble organic solvent having a boiling point of lower than 100° C. in the ink is preferably less than 5% by mass, more preferably less than 3% by mass and even more preferably less than 1% by mass, and a lower limit of the content of the water-soluble organic solvent having a boiling point of lower than 100° C. in the ink is 0% by mass.

<20> The aqueous gravure ink according to any one of the aspects <1> to <19>, wherein the water-soluble organic solvent further contains a glycol.

<21> The aqueous gravure ink according to the aspect <20>, wherein a content of the glycol in the ink is preferably not less than 0.5% by mass, more preferably not less than 1% by mass and even more preferably not less than 2% by mass, and is also preferably not more than 8% by mass, more preferably not more than 6% by mass and even more preferably not more than 4% by mass.

<22> The aqueous gravure ink according to any one of the aspects <1> to <21>, wherein a content of the surfactant in the ink is preferably not less than 0.01% by mass, more preferably not less than 0.1% by mass and even more preferably not less than 0.2% by mass, and is also preferably not more than 5% by mass, more preferably not more than 4% by mass and even more preferably not more than 3% by mass.

<23> The aqueous gravure ink according to any one of the aspects <1> to <22>, wherein a content of the acetylene glycol-based surfactant in the ink is preferably not less than 0.3% by mass, more preferably not less than 0.5% by mass and even more preferably not less than 0.7% by mass, and is also preferably not more than 5% by mass, more preferably not more than 4% by mass and even more preferably not more than 3% by mass.

<24> The aqueous gravure ink according to any one of the aspects <1> to <23>, wherein the acetylene glycol-based surfactant is preferably at least one acetylene glycol selected from the group consisting of 2,4,7,9-tetramethyl-5-decyne-4,7-diol, 3,6-dimethyl-4-octyne-3,6-diol and 2,5-dimethyl-3-hexyne-2,5-diol, or an ethyleneoxide adduct of the acetylene glycol, and more preferably 2,4,7,9-tetramethyl-5-decyne-4,7-diol.

<25> The aqueous gravure ink according to any one of the aspects <1> to <24>, wherein a viscosity of the ink as measured at 20° C. using a Zahn cup viscometer (No. 3) is preferably not less than 10 seconds, more preferably not less than 12 seconds and even more preferably not less than 14 seconds, and is also preferably not more than 25 seconds, more preferably not more than 23 seconds and even more preferably not more than 21 seconds.

<26> A gravure printing method using the aqueous gravure ink according to any one of the aspects <1> to <25>.

<27> A process for producing a gravure printed material, including the step of printing characters or images on a printing substrate by a gravure printing method using the aqueous gravure ink according to any one of the aspects <1> to <25>.

<28> A use of the aqueous gravure ink according to any one of the aspects <1> to <25> as an ink for gravure printing.

EXAMPLES

The present invention will be explained in more detail by referring to the following Examples, etc. In the following Examples, etc., the respective properties were measured by the following methods. Meanwhile, the "part(s)" and "%" as used herein indicate "part(s) by mass" and "% by mass", respectively, unless otherwise specified.

(1) Measurement of Weight-Average Molecular Weight of Polymer

The molecular weight of the polymer was measured by gel permeation chromatography [GPA apparatus: "HLA-8120GPA" available from Tosoh Corporation; columns: "TSK-GEL, $\alpha$M" x 2 available from Tosoh Corporation; flow rate: 1 mL/min)] using a solution prepared by dissolving phosphoric acid and lithium bromide in N,N-dimethyl formamide such that concentrations of phosphoric acid and lithium bromide in the solution were 60 mmol/L and 50 mmol/L, respectively, as an eluent. Meanwhile, in the aforementioned measurement, a monodisperse polystyrene having a known molecular weight was used as a reference standard substance.

(2) Measurement of Acid Value of Polymer

In an automatic potentiometric titrator (power burette; "Model No.: APB-610") available from Kyoto Electronics Manufacturing Co., Ltd., a resin was dissolved in a titrant solution prepared by mixing toluene and acetone at a mixing ratio of 2:1, and the resulting solution was subjected to titration with a 0.1N potassium hydroxide/ethanol solution by a potentiometric titration method until reaching an end point of the titration observed as an inflection point of the titration curve. The acid value of the polymer was calculated from an amount (titer) of the potassium hydroxide solution used in the titration until reaching the end point.

(3) Measurement of Solid Content

Sodium sulfate dried to constant weight in a desiccator was weighed in an amount of 10.0 g and charged into a 30 mL polypropylene container (4:40 mm; height: 30 mm), and about 1.0 g of a sample to be measured was added to the container. The contents of the container were mixed and then accurately weighed. The resulting mixture was maintained in the container at 105° C. for 2 hours to remove volatile components therefrom, and further allowed to stand in a desiccator for 15 minutes to measure a mass thereof. The mass of the sample after removing the volatile components therefrom was regarded as a mass of solids in the sample.

The solid content of the sample was calculated by dividing the mass of the solids by the mass of the sample initially added.

(4) Measurement of Average Particle Sizes of Pigment Particles A and Pigment-Free Polymer Particles B The cumulant average particle sizes of the pigment particles A and the pigment-free polymer particles B were respectively measured using a laser particle analyzing system "Model No.: ELS-8000" (cumulant analysis) available from Otsuka Electrics Co., Ltd. The cumulant average particle sizes thus measured were defined as respective average particle sizes of the pigment particles A and the pigment-free polymer particles B. As the sample to be measured, there was used the dispersion that was diluted with water such that a concentration of the particles to be measured in the dispersion was adjusted to $5 \times 10^{-3}$%. The measurement was conducted under the conditions including a temperature of 25° C., an angle between incident light and detector of 90° and a cumulative number of 100 times, and a refractive index of water (1.333) was input to the analyzing system as a refractive index of the dispersing medium.

(5) Measurement of Viscosity of Ink

The viscosity of the ink was measured at 20° C. using a Zahn cup viscometer (No. 3) available from RIGO Co., Ltd.

(6) Measurement of pH of Ink

The pH value of the ink was measured at 20° C. using a bench-top pH meter "F-71" available from Horiba Ltd., equipped with a pH electrode "6337-10D" available from Horiba Ltd.

Production Example I (Production of Water-Soluble Polymer (a1))

A 2 L-capacity glass reaction vessel equipped with dropping funnels was charged with 233 g of ion-exchanged water, and the ion-exchanged water in the reaction vessel was heated to 80° C. in a nitrogen atmosphere. Then, in the nitrogen atmosphere, three dropping solutions, i.e., a monomer solution containing 34.0 g of methacrylic acid and 164.0 g of methoxypolyethylene glycol monomethacrylate "NK ESTER M-230G" (tradename; average molar number of addition of ethyleneoxide (EO): n=23) available from Shin-Nakamura Chemical Co., Ltd., as a dropping solution 1, 27 g of a 7%-conc. 2-mercaptoethanol aqueous solution as a dropping solution 2, and 32 g of a 6%-conc. ammonium persulfate aqueous solution as a dropping solution 3, were respectively gradually added dropwise at the same time into the reaction vessel over 90 minutes. Next, 11 g of the 6%-conc. ammonium persulfate aqueous solution was gradually added dropwise into the reaction vessel over 30 minutes. After completion of the dropwise addition, the resulting mixed solution was aged at 80° C. for 1 hour.

Thereafter, the resulting reaction solution was cooled to 40° C., and then 13 g of a 48%-conc. sodium hydroxide aqueous solution was added thereto to neutralize the solution. Then, ion-exchanged water was added to the resulting reaction mixture to adjust a solid content thereof to 40%, thereby obtaining a solution of a water-soluble polymer (a1) (weight-average molecular weight: 51,000; acid value: 113 mgKOH/g).

Production Example II (Production of Water Dispersion of Pigment Particles A1)

A 250 mL-capacity polyethylene bottle was charged with 0.188 g of the solution of the water-soluble polymer (a1) obtained in Production Example I, 15.0 g of titanium dioxide "CR80" (tradename) available from ISHIHARA SANGYO KAISHA, LTD., and 15.3 g of ion-exchanged water. Furthermore, 369 g of zirconia beads were added to the polyethylene bottle, and the contents of the polyethylene bottle were dispersed at 25° C. for 8 hours using a bench top-type pot mill pedestal available from AS ONE Corporation. Thereafter, the resulting dispersion was filtered through a mesh to remove the zirconia beads from the dispersion, thereby obtaining a water dispersion of pigment particles A1 containing the white pigment (solid content: 51%; average particle size: 350 nm).

Production Example III (Production of Water Dispersion of Pigment-Free Water-Insoluble Polymer Particles B1>

A 3 L-capacity reaction vessel equipped with a dropping funnel was charged with 5.1 g of methacrylic acid, 13.4 g of methyl methacrylate available from Wako Pure Chemical Industries, Ltd., 5.0 g of 2-ethylhexyl acrylate available from Wako Pure Chemical Industries, Ltd., 11.1 g of "LATEMUL E-118B" (sodium polyoxyethylenealkylethersulfate) as a surfactant available from Kao Corporation, 0.2 g of potassium persulfate as a polymerization initiator available from Wako Pure Chemical Industries, Ltd., and 282.8 g of ion-exchanged water, and the contents of the reaction vessel were mixed and emulsified at 150 rpm for 30 minutes. Then, an inside atmosphere of the reaction vessel was replaced with nitrogen gas, thereby obtaining an initially charged monomer solution.

Next, 30.4 g of methacrylic acid, 254.6 g of methyl methacrylate, 95.0 g of 2-ethylhexyl acrylate, 35.1 g of "LATEMUL E-118B", 0.6 g of potassium persulfate and 183 g of ion-exchanged water were mixed with each other at 150 rpm to prepare a dropping monomer solution. The resulting dropping monomer solution was charged into the dropping funnel, and an inside atmosphere of the dropping funnel was replaced with nitrogen gas.

In a nitrogen atmosphere, the initially charged monomer solution in the reaction vessel was heated from room temperature to 80° C. over 30 minutes while stirring at 150 rpm, and while maintaining the initially charged monomer solution at 80° C., the dropping monomer solution in the dropping funnel was gradually added dropwise to the reaction vessel over 3 hours. After completion of the dropwise addition, while maintaining the inside temperature of the reaction vessel, the resulting mixed solution in the reaction vessel was stirred for 1 hour, and mixed with 204.7 g of ion-exchanged water. Then, the resulting dispersion was filtered through a stainless steel wire mesh (200 mesh), thereby obtaining a water dispersion of pigment-free water-insoluble polymer particles B1 (weight-average molecular weight: 365,000; acid value: 52 mgKOH/g) (solid content of the dispersion: 40%; average particle size of the polymer particles: 100 nm).

<Production of Aqueous Gravure Ink>

Production Example 1 (Production of Ink 1)

A production vessel was charged with 40 parts of the water dispersion of the pigment particles A1 obtained in Production Example II (corresponding to a concentration of the pigment in the ink: 20% and a concentration of the polymer (a1) of 0.4%; solid content: 51%), and then with 13.3 parts of ion-exchanged water and 1.7 parts of a thickening agent "ADEKANOL UH-420" (tradename; special nonionic polymer surfactant; solid content: 30%) available from ADEKA Corporation so as to obtain such an ink composition as shown in Table 1, followed by stirring the contents of the production vessel at 150 rpm. Furthermore, 5 parts of the water dispersion of the water-insoluble polymer particles B1 obtained in Production Example III (corresponding to a concentration of the polymer B1 in the ink of 2%; solid content: 40%) and 33 parts of an emulsion of pigment-free water-insoluble polymer particles B2 "VINYBLAN 700" (tradename; corresponding to a concentration of the polymer B2 in the ink of 10%; vinyl chloride-acrylic hybrid resin emulsion; solid content: 30%) available from Nissin Chemical Co., Ltd., were added to the production vessel, followed by further stirring the contents of the production vessel. In addition, 1 part of propylene glycol, 4 parts of ethylene glycol monomethyl ether and 2 parts of a surfactant "SURFYNOL 104PG-50" (tradename; a 50% propylene glycol solution of an acetylene glycol-based surfactant (2,4,7,9-tetramethyl-5-decyne-4,7-diol)) available from Air Products & Chemicals, Inc., were added to the production vessel, and the contents of the production vessel were stirred at room temperature for 30 minutes, and further the resulting mixture was filtered through a stainless steel wire mesh (200 mesh), thereby obtaining an ink 1. Meanwhile, the whole amount of propylene glycol contained in the ink 1 was 2 parts as a sum of 1 part of the propylene glycol added above and 1 part of propylene glycol derived from the surfactant "SURFYNOL 104PG-50".

The viscosity value of the ink 1 as measured at 20° C. was 21 seconds, and the pH value of the ink 1 as measured at 20° C. was 7.6.

Production Examples 2 to 15 (Production of Inks 2 to 15)

The same procedure as in Production Example 1 was repeated except that the composition and amounts used in Production Example 1 were changed to those shown in Table 1, thereby obtaining inks 2 to 15. In the case where "SURFYNOL 104PG-50" (tradename; active ingredient content: 50%) available from Air Products & Chemicals, Inc., was used as the surfactant, the whole amount of propylene glycol contained in the respective inks was a sum of the propylene glycol added and propylene glycol derived from the aforementioned surfactant.

The viscosity values of the inks 2 to 15 as measured at 20° C. all were 21 seconds, and the pH values of the inks 2 to 15 as measured at 20° C. were in the range of 7.5 to 7.6.

Meanwhile, the respective notations in Table 1 were as follows.

Polymer particles B2: Vinyl chloride-acrylic hybrid resin emulsion; solid content: 30%; "VINYBLAN 700" (tradename) available from Nissin Chemical Co., Ltd.

MG: Ethylene glycol monomethyl ether (boiling point (b.p.) 125° C.) available from Wako Pure Chemical Industries, Ltd.

iPG: Ethylene glycol monoisopropyl ether (b.p. 142° C.) available from Wako Pure Chemical Industries, Ltd.

BG: Ethylene glycol monobutyl ether (b.p. 171° C.) available from Wako Pure Chemical Industries, Ltd.

MDG: Diethylene glycol monomethyl ether (b.p. 194° C.) available from Wako Pure Chemical Industries, Ltd.

iPDG: Diethylene glycol monoisopropyl ether (b.p. 207° C.) available from Wako Pure Chemical Industries, Ltd.

iBDG: Diethylene glycol monoisobutyl ether (b.p. 220° C.) available from Wako Pure Chemical Industries, Ltd.

BDG: Diethylene glycol monobutyl ether (b.p. 231° C.) available from Wako Pure Chemical Industries, Ltd.

BTG: Triethylene glycol monobutyl ether (b.p. 271° C.) available from Wako Pure Chemical Industries, Ltd.

PG: Propylene glycol (b.p. 188° C.) available from Wako Pure Chemical Industries, Ltd.

iPA: 2-Propanol (b.p. 82° C.) available from Wako Pure Chemical Industries, Ltd.

SF104PG50: Acetylene glycol-based surfactant (a 50% propylene glycol-diluted solution of 2,4,7,9-tetramethyl-5-decyne-4,7-diol (HLB: 3.0)); "SURFYNOL 104PG-50" (tradename; active ingredient content: 50%) available from Air Products & Chemicals, Inc.

SF420: Acetylene glycol-based surfactant (an adduct of 2,4,7,9-tetramethyl-5-decyne-4,7-diol with 1.3 mol (on average) of EO (HLB: 4.7)); "SURFYNOL 420" (tradename; active ingredient content: 100%) available from Air Products & Chemicals, Inc.

KF6011: Polyether-modified silicone surfactant "KF-6011" (tradename; PEG-11 methyl ether dimethicone) available from Shin-Etsu Chemical Co., Ltd.

Thickening agent: "ADEKANOL UH-420" available from ADEKA Corporation

The amount of SF104PG50 shown in Table 1 represents an amount of an active ingredient thereof.

Examples 1 to 11 and Comparative Examples 1 to 4

<Printing Test>

Using the inks obtained in Production Examples 1 to 11 (Examples 1 to 11; inks 1 to 11) and the inks obtained in Production Examples 12 to 15 (Comparative Examples 1 to 4; inks 12 to 15), gravure printing was conducted on a corona-treated surface of an OPP film "FOR-AQ #20" (laminate grade) available from Futamura Chemical Co, Ltd. In the gravure printing, a solid image having an optical density of 100% was printed by an electronic engraving plate (number of lines: 175 lines/in; plate depth: 31 μm) attached to a bench-top gravure printing tester "K PRINTING PROOFER" available from MATSUO SANGYO Co., Ltd.

<Evaluation of Leveling Properties>

The thus printed solid image having an optical density of 100% was evaluated for its color unevenness or mottling using a handy-type image evaluation system "PIAS-II" available from QEA, Inc. The region to be observed was set to a region of 17.7 mm in longitudinal direction and 23.3 mm in lateral direction among the solid image being printed, and the resolution was adjusted to 423 μm in each of longitudinal and lateral directions, i.e., 423 μm in square, per one pixel, and the region of the one pixel was defined as a "tile". Using a soft ware attached to the evaluation system, reflection densities of all of the tiles were determined to quantify a standard deviation of these reflection densities as a mottle, thereby evaluating leveling properties of the ink according to the following evaluation ratings.

When the evaluation rating is A or B, the ink can be practically used to a sufficient extent, and when the evaluation rating is C, the ink can be still practically used. The results are shown in Table 1.

(Evaluation Ratings)

A: Mottle is not less than 0 and less than 2.5.
B: Mottle is not less than 2.5 and less than 3.0.
C: Mottle is not less than 3.0 and less than 3.2.
D: Mottle is not less than 3.2.

TABLE 1

| | | Examples | | | | | | | | | | | Comparative Examples | | | |
|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 |
| Ink No. | | 1 | 2 | 3 | 4 | 5 | 6 | 7 | 8 | 9 | 10 | 11 | 12 | 13 | 14 | 15 |
| Composition (part(s)) | | | | | | | | | | | | | | | | |
| Pigment | White pigment | 20 | 20 | 20 | 20 | 20 | 20 | 20 | 20 | 20 | 20 | 20 | 20 | 20 | 20 | 20 |
| Polymer | Polymer (a1) | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| | Polymer particles B1 | 2 | 2 | 2 | 2 | 2 | 2 | 2 | 2 | 2 | 2 | 2 | 2 | 2 | 2 | 2 |
| | Polymer particles B2 | 10 | 10 | 10 | 10 | 10 | 10 | 10 | 10 | 10 | 10 | 10 | 10 | 10 | 10 | 10 |
| Water-soluble organic solvent | MG (b.p. 125° C.) | 4 | | | | | | | | | | | | | | |
| | iPG (b.p. 142° C.) | | 4 | | | | | | | | | | | | | |
| | BG (b.p. 171° C.) | | | 4 | | | | | | | | | | | | |
| | MDG (b.p. 194° C.) | | | | 4 | | | | | | | | | | | |
| | iPDG (b.p. 207° C.) | | | | | 4 | | | | | | | | | | |
| | iBDG (b.p. 220° C.) | | | | | | 4 | | 4 | 2 | 9 | 4 | 4 | | | 15 |
| | BDG (b.p. 231° C.) | | | | | | | 4 | | | | | | | | |
| | BTG (b.p. 271° C.) | | | | | | | | | | | | | 4 | | |
| | PG (b.p. 188° C.) | 2 | 2 | 2 | 2 | 2 | 2 | 2 | 2 | 1 | 1 | 2 | 2 | 2 | 6 | 2 |
| | iPA (b.p. 82° C.) | | | | | | | | | | 3.5 | | | | | |
| Surfactant | SF104PG50 | 1 | 1 | 1 | 1 | 1 | 1 | 1 | | 1 | 1 | 1 | | 1 | 1 | 1 |
| | SF420 | | | | | | | | 1 | | | | | | | |
| | KF6011 | | | | | | | | | | | | 1 | | | |
| | Water | 60.1 | 60.1 | 60.1 | 60.1 | 60.1 | 60.1 | 60.1 | 60.1 | 63.1 | 56.1 | 56.6 | 60.1 | 60.1 | 60.1 | 49.1 |
| | Thickening agent | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Leveling properties | | | | | | | | | | | | | | | | |
| | Mottle | 1.9 | 1.9 | 1.9 | 2.4 | 2.3 | 2.4 | 2.5 | 2.9 | 2.1 | 2.6 | 3.0 | 3.5 | 3.7 | 3.3 | 3.4 |
| | Evaluation | A | A | A | A | A | A | B | B | A | B | C | D | D | D | D |

As is apparent from Table 1, the inks obtained in Examples 1 to 11 contained the glycol ether having a boiling point of not lower than 100° C. and not higher than 260° C. in an amount of not less than 1% by mass and not more than 10% by mass, the total content of the water-soluble organic solvent in the respective inks was not more than 15% by mass, the surfactant used in the respective inks was the acetylene glycol-based surfactant, and further the content of water in the respective inks was not less than 50% by mass and not more than 70% by mass. Therefore, the inks obtained in Examples 1 to 11 exhibited low mottle and therefore were excellent in leveling properties.

On the other hand, the silicone-based surfactant was used in Comparative Example 1, and the boiling point of the glycol ether used in Comparative Example 2 was higher than 260° C. In addition, the content of the glycol ether in the ink obtained in Comparative Example 3 was 0% by mass, whereas the content of the glycol ether in the ink obtained in Comparative Example 4 was more than 10% by mass, and the total content of the water-soluble organic solvent in the ink obtained in Comparative Example 4 was more than 15% by mass. As a result, the inks obtained in Comparative Examples 1 to 4 were deteriorated in wettability and drying properties and had poor leveling properties as compared to the inks obtained in Examples 1 to 11.

INDUSTRIAL APPLICABILITY

The aqueous gravure ink according to the present invention has a less burden on the environment and is capable of performing high-resolution printing owing to its excellent leveling properties, and therefore can be suitably used as an ink for gravure printing.

The invention claimed is:

1. An aqueous gravure ink comprising a pigment, a polymer, a water-soluble organic solvent, a surfactant and water,
   in which the polymer comprises polymer (a);
   the pigment is in the form of pigment particles A dispersed with the polymer (a);
   the water-soluble organic solvent comprises a glycol ether having a boiling point of not lower than 100° C. and not higher than 260° C., and a content of the glycol ether in the ink is not less than 1% by mass and not more than 10% by mass;
   the water-soluble organic solvent further comprises an other water-soluble organic solvent than the glycol ether and the other water-soluble organic solvent is a glycol having a boiling point of not lower than 100° C. and not higher than 260° C.;
   a total content of the water-soluble organic solvent in the ink is not more than 15% by mass;
   a mass ratio of the glycol ether to a whole amount of the water-soluble organic solvent used (glycol ether/whole amount of water-soluble organic solvent) in the ink is from 5/10 to 9/10;
   the surfactant comprises an acetylene glycol-based surfactant;
   Hydrophilic-Lipophilic Balance value of the acetylene glycol-based surfactant is not less than 0 and not more than 4.5; and
   a content of water in the ink is not less than 50% by mass and not more than 70% by mass.

2. The aqueous gravure ink according to claim 1, wherein the glycol ether is at least one compound selected from the group consisting of an alkylene glycol monoalkyl ether and an alkylene glycol dialkyl ether.

3. The aqueous gravure ink according to claim 1, wherein a content of the glycol in the ink is not less than 0.5% by mass and not more than 8% by mass.

4. The aqueous gravure ink according to claim 1, wherein a content of the acetylene glycol-based surfactant in the ink is not less than 0.7% by mass and not more than 3% by mass.

5. The aqueous gravure ink according to claim 1, wherein a mass ratio of the polymer to the pigment [polymer/pigment] in the ink is from 20/100 to 300/100.

6. The aqueous gravure ink according to claim 1, wherein a content of the pigment particles A in the ink is not less than 1% by mass and not more than 40% by mass.

7. The aqueous gravure ink according to claim 1, wherein a content of the water-soluble organic solvent having a boiling point of higher than 260° C. in the ink is not more than 5% by mass.

8. The aqueous gravure ink according to claim 1, wherein a mass ratio of the glycol to the glycol ether [glycol/glycol ether] in the ink is from 10/90 to 70/30.

9. The aqueous gravure ink according to claim 1, wherein a content of the surfactant in the ink is not less than 0.01% by mass and not more than 5% by mass.

10. The aqueous gravure ink according to claim 1, wherein a mass ratio of the acetylene glycol-based surfactant to a whole amount of the surfactant [acetylene glycol-based surfactant/whole amount of surfactant] in the ink is from 1/10 to 10/10.

11. The aqueous gravure ink according to claim 1, wherein the polymer (a) is a vinyl-based polymer.

12. The aqueous gravure ink according to claim 11, wherein the vinyl-based polymer comprises a constitutional unit derived from (a-1) an ionic monomer in an amount of not less than 5% by mass and not more than 40% by mass.

13. The aqueous gravure ink according to claim 1, the polymer further comprises polymer (b) as pigment-free water-insoluble polymer particles B.

14. The aqueous gravure ink according to claim 13, wherein the polymer (b) constituting the polymer particles B is at least one resin selected from the group consisting of an acrylic resin and a vinyl chloride-acrylic resin.

15. The aqueous gravure ink according to claim 13, wherein a content of the polymer particles B in the ink is not less than 1% by mass and not more than 30% by mass.

* * * * *